US009451218B2

(12) United States Patent
Hanabusa

(10) Patent No.: US 9,451,218 B2
(45) Date of Patent: Sep. 20, 2016

(54) WIRELESS SYNCHRONOUS SYSTEM, RADIO APPARATUSES, SENSOR DEVICES, WIRELESS SYNCHRONIZING METHOD, AND COMPUTER-READABLE RECORDING MEDIUM

(71) Applicant: CASIO COMPUTER CO., LTD., Tokyo (JP)

(72) Inventor: Toshio Hanabusa, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 283 days.

(21) Appl. No.: 13/926,911

(22) Filed: Jun. 25, 2013

(65) Prior Publication Data

US 2014/0002664 A1 Jan. 2, 2014

(30) Foreign Application Priority Data

Jun. 29, 2012 (JP) ................................ 2012-147066

(51) Int. Cl.
*H04N 7/18* (2006.01)
*H04N 5/232* (2006.01)
(Continued)

(52) U.S. Cl.
CPC ................ *H04N 7/181* (2013.01); *H04N 5/04* (2013.01); *H04N 5/232* (2013.01); *H04N 21/242* (2013.01); *H04N 5/247* (2013.01)

(58) Field of Classification Search
CPC ........ H04N 7/181; H04N 5/04; H04N 5/232; H04N 21/242; H04N 5/247
See application file for complete search history.

(56) References Cited

U.S. PATENT DOCUMENTS 5,066,922 A * 11/1991 Leitch ...................... H03C 3/08 330/149
7,539,457 B2 * 5/2009 Lim ...................... H04W 76/02 370/318

(Continued)

FOREIGN PATENT DOCUMENTS

JP 07-289676 A 11/1995
JP 2000236466 A 8/2000

(Continued)

OTHER PUBLICATIONS

Japanese Office Action dated Apr. 18, 2014 issued in Japanese Application No. 2012-147066.

(Continued)

*Primary Examiner* — Jay Patel
*Assistant Examiner* — Joseph Suh
(74) *Attorney, Agent, or Firm* — Holtz, Holtz & Volek PC

(57) ABSTRACT

A wireless synchronous system includes an apparatus and a sensor device. The apparatus has a radio communication unit for performing synchronous communication with an external apparatus. The apparatus generates a radio synchronizing signal having a predetermined cycle synchronized with the synchronous communication and determines a timing of controlling the apparatus based on the radio synchronizing signal. The sensor device has a radio communication unit for performing synchronous communication with the external apparatus. The sensor generates a radio synchronizing signal having a predetermined cycle being synchronized with the synchronous communication, obtains detection-data representing a state of the sensor device, and determines a timing of obtaining the detection-data in accordance with the radio synchronizing signal.

11 Claims, 17 Drawing Sheets

(51) Int. Cl.
*H04N 5/04* (2006.01)
*H04N 21/242* (2011.01)
*H04N 5/247* (2006.01)

(56) References Cited

U.S. PATENT DOCUMENTS 8,279,896 B2* 10/2012 Etkin .................... H04W 56/00 370/503
8,920,345 B2* 12/2014 Greenberg ........... A61B 5/1101 600/595
2001/0022614 A1* 9/2001 Iida ....................... G06T 7/0002 348/92
2002/0009296 A1* 1/2002 Shaper ................... G03G 15/05 396/56
2002/0021219 A1* 2/2002 Edwards .............. A01K 15/021 340/573.1
2002/0082035 A1* 6/2002 Aihara .................. H04W 84/20 455/518
2002/0159434 A1* 10/2002 Gosior .................. H04L 1/1685 370/350
2002/0174364 A1* 11/2002 Nordman .......... H04L 29/12009 726/15
2003/0189638 A1* 10/2003 Fry ........................ H04B 1/713 348/154
2004/0032495 A1* 2/2004 Ortiz ...................... H04N 5/232 348/157
2004/0127167 A1* 7/2004 Zipper ...................... H03J 3/18 455/77
2004/0143602 A1* 7/2004 Ruiz ...................... H04N 7/181
2004/0203384 A1* 10/2004 Sugikawa ............. H04W 12/06 455/41.2
2005/0153669 A1* 7/2005 Suzuki .................. H03F 1/3247 455/103
2006/0002366 A1* 1/2006 Kawaguchi ............. H04L 45/00 370/349
2006/0265176 A1* 11/2006 Yamauchi .............. G01K 1/022 702/130
2007/0291676 A1* 12/2007 Berggren ................ H03L 1/025 370/328
2008/0279158 A1* 11/2008 Schmidt .............. H04L 63/0428 370/338
2009/0080290 A1* 3/2009 Ray .......................... G01V 1/24 367/51
2009/0189981 A1* 7/2009 Siann ..................... H04N 7/183 348/143
2009/0222589 A1* 9/2009 Kirsch ..................... G04G 5/00 709/248
2009/0323880 A1* 12/2009 Filer ..................... H04J 3/0685 375/376
2010/0008658 A1* 1/2010 King ...................... G03B 17/00 396/56
2010/0040123 A1* 2/2010 Iwata ....................... G01R 1/07 375/220
2010/0165795 A1* 7/2010 Elder ..................... G04G 5/002 368/10
2011/0007650 A1* 1/2011 Nam ......................... G01S 5/14 370/252
2011/0058529 A1* 3/2011 Uemura ............ H04W 36/0077 370/331
2011/0103337 A1* 5/2011 Bryant ..................... G04G 7/02 370/329
2011/0109726 A1* 5/2011 Hwang .............. H04N 13/0242 348/47
2011/0133655 A1* 6/2011 Recker ...................... H02J 9/02 315/159
2011/0176535 A1* 7/2011 Lipka ................ H04W 56/0045 370/350
2011/0214030 A1* 9/2011 Greenberg ............. A61B 5/002 714/748
2011/0216658 A1* 9/2011 Etkin ...................... H04L 12/26 370/242
2012/0274793 A1 11/2012 Choi
2012/0314081 A1* 12/2012 Kleihorst ........... G06K 9/00771 348/159
2013/0002868 A1* 1/2013 Yoshimitsu ...... G08B 13/19608 348/143

FOREIGN PATENT DOCUMENTS

JP 2006217326 A 8/2006
JP 2009-296323 A 12/2009
KR 1020110064377 A 6/2011
WO WO 2011/071277 A2 6/2011

OTHER PUBLICATIONS

Korean Office Action dated May 13, 2014 in counterpart Korean Application No. 10-2013-0074494.

* cited by examiner

101
VSYNC
HSYNC
VTRG
210
VIDEO SYNCHRONIZING SIGNAL GENERATING UNIT
WSYNC
209
208
RADIO COMMUNICATION UNIT
DATA
201
IMAGE PICKUP UNIT
202
IMAGE PROCESSING UNIT
203
DISPLAYING UNIT
204
MEMORY
205
HOST-CPU
206
OPERATING UNIT
207
RTC
211
POWER UNIT 103
309
308
RADIO COMMUNICATION UNIT
WSYNC
DATA
303
RTC
302
HOST-CPU
305
OPERATING UNIT
301
SENSOR UNIT
DATA
DATA
304
MEMORY
306
POWER UNIT 208,308
209,309
402
RF UNIT
405
RX TIMING EXTRACTING UNIT
406
TCXO
RXT
403
RADIO TIME GENERATING UNIT
404
PLL CIRCUIT
401
BB UNIT
WTIME
PLL-CLK
407
CONTROLLING UNIT
DATA
WSYNC 101a
201
IMAGE PICKUP UNIT
VSYNC HSYNC VTRG
210
VIDEO SYNCHRONIZING SIGNAL GENERATING UNIT
WSYNC
208
RADIO COMMUNICATION UNIT
101b
101c
103a
103b
301
SENSOR UNIT
DATA
302
HOST-CPU
308

103a
301
SENSOR UNIT
DATA
302
HOST-CPU
WSYNC
308
RADIO COMMUNICATION UNIT
103b
301
SENSOR UNIT
DATA
302
HOST-CPU
WSYNC
308
RADIO COMMUNICATION UNIT 101a
201
IMAGE PICKUP UNIT
VSYNC HSYNC VTRG
210
VIDEO SYNCHRONIZING SIGNAL GENERATING UNIT
WSYNC
208
RADIO COMMUNICATION UNIT
103a,103b
308
RADIO COMMUNICATION UNIT
WSYNC
302
HOST-CPU
DATA
301
SENSOR UNIT 101a
208
RADIO COMMUNICATION UNIT
WSYNC
210
VIDEO SYNCHRONIZING SIGNAL GENERATING UNIT
VSYNC HSYNC VTRG
201
IMAGE PICKUP UNIT
205
HOST-CPU
203
DISPLAYING UNIT
204
MEMORY
101b,101c
208
RADIO COMMUNICATION UNIT
WSYNC
210
VIDEO SYNCHRONIZING SIGNAL GENERATING UNIT
VSYNC HSYNC VTRG
201
IMAGE PICKUP UNIT
205
HOST-CPU
204
MEMORY
203
DISPLAYING UNIT 101a
201
IMAGE PICKUP UNIT
VSYNC
HSYNC VTRG
210
VIDEO SYNCHRONIZING SIGNAL GENERATING UNIT
WSYNC
208
RADIO COMMUNICATION UNIT
DATA
205
HOST-CPU
203
DISPLAYING UNIT
103a,103b
301
SENSOR UNIT
DATA
302
HOST-CPU
WSYNC
DATA
308
RADIO COMMUNICATION UNIT

RADIO TIME WTIME
MASTER SENSDING/RECEIVING
MASTER PLL-CLK
MASTER WSYNC
SLAVE SENSDING/RECEIVING
SLAVE RXT
SLAVE PLL-CLK
SLAVE WSYNC
T00
T01
T02
T03
T04
T05
T06
T07
T08
T09
T10
T11
T12
T13
T14
T15
TX
RX
CYCLE : T1 SECONDS 101a
205
HOST-CPU
DATA
WSYNC
208
RADIO COMMUNICATION UNIT
209
101b
205
HOST-CPU
DATA
WSYNC
208
RADIO COMMUNICATION UNIT
209
101c
205
HOST-CPU
DATA
WSYNC
208
RADIO COMMUNICATION UNIT
209

RADIO TIME WTIME
T00
T01
T02
T03
T04
T05
T06
T07
T08
T09
T10
T11
T12
T13
T14
T15
MASTER (M) SENSDING/RECEIVING
MASTER (M) PLL-CLK
MASTER (M) WSYNC
SLAVE (S1) SENSDING/RECEIVING
SLAVE (S1) RXT
SLAVE (S1) PLL-CLK
SLAVE (S1) WSYNC
SLAVE (S2) SENSDING/RECEIVING
SLAVE (S2) RXT
SLAVE (S2) PLL-CLK
SLAVE (S2) WSYNC
TX
RX
CYCLE : T1 SECONDS

WIRELESS SYNCHRONOUS SYSTEM, RADIO APPARATUSES, SENSOR DEVICES, WIRELESS SYNCHRONIZING METHOD, AND COMPUTER-READABLE RECORDING MEDIUM

CROSS-REFERENCE TO RELATED APPLICATION

The present application is based upon and claims the benefit of priority from the prior Japanese Patent Application No. 2012-147066, filed Jun. 29, 2012, the entire contents of which are incorporated herein by reference.

BACKGROUND OF THE INVENTION

1. Field of the Invention

The present invention relate to a wireless synchronous system, radio apparatuses, sensor devices, a wireless synchronizing method, and a non-transitory computer-readable recording medium.

2. Description of the Related Art

Conventional techniques are known, which use plural high-speed cameras synchronized with each other for continuously shooting fast-moving phenomena such as blasts, crashes, combustions, shocks, discharge, and the like. And also techniques are known, which use a video camera to record images of an athlete for purpose of sport training (for instance, golf), and use sensor devices attached onto the athlete to detect and record data.

A technique is disclosed in Japanese Unexamined Patent Publication No. 2009-296323, in which one master camera is connected to plural slave cameras, and a video synchronizing signal for a high-speed camera is transferred from the master camera to the plural slave cameras, whereby plural high-speed cameras are brought into synchronization for shooting one object.

In the above disclosed technique, the master camera is provided with a timing controlling unit for establishing an accurate synchronization among the master camera and the plural slave cameras. The timing controlling unit uses a pulse signal to measure an actual delay along a transmitting path and corrects such delay based on the result of the measurement. The technique is used for continuously shooting fast-moving phenomena such as blasts, crashes, combustions, shocks, discharge, and the like, and belongs to a class of high-speed cameras for very specific business use, which are capable of shooting at an extremely high rate of a million frames per second.

Japanese Unexamined Patent Publication No. Hei07-289676 discloses another technique, which uses a video camera(s) to record an image of the athlete and a sensor device (s) attached on the athlete to detect and record sensor data for purpose of analysis of golf playing motion.

The technique disclosed in the latter publication consists of a video camera(s) and a sensor device(s). The video camera has its own real time clock, and records a video image as well as a time code based on a real time counted by its own real time clock. Also, the sensor device has its own real time clock, and measures and records sensor data (grip strength) as well as time information based on a real time counted by its own real time clock. Then, both the information of the video camera and the information of the sensor device are compared, and the sensor data is displayed, which corresponds to the time coincident to the time code of the video image. As another example, the sensor device transfers a measured sensor signal by means of analog radio communication to an audio input of the video camera for shooting a video image and the video camera records the received sensor data together with the video image.

But the technique disclosed in Japanese Unexamined Patent Publication No. 2009-296323 requires users to prepare accurate and troublesome settings before performing the shooting operation, such as calculating a delay time for correction by using a pulse signal. Therefore, the technique has a disadvantage that is hard for the consumer users to use.

The method of measuring a delay, using the pulse signal has another disadvantage that an accurate measurement cannot be made because of uncertain delays caused due to sampling and/or packet operations in digital radio transmission, when said method is used to measure a delay along a radio transmission path.

An accurate delay along an analog transmission path can be measured, but communication only between one master apparatus and one slave apparatus can be made along the analog transmission path. Therefore, the master equipment is required to equip with the same number of radio units as number of slave apparatuses, which increases the system in scale and costs, consuming much energy.

In the technique disclosed by Japanese Unexamined Patent Publication No. Hei07-289676, differences between the clocks of the respective apparatuses are large. The technique cannot be used for synchronous shooting by plural high-speed cameras. The technique has a problem that sensor information cannot be obtained in synchronization with the images shot by the high-speed cameras. In the case where the analog radio transmission is used, only one sort of sensor data can be recorded, and therefore, the technique cannot be used for recording, for instance, three-dimensional data, X, Y, Z.

SUMMARY OF THE INVENTION

The present invention provides a wireless synchronous system, radio apparatuses, sensor devices, a wireless synchronizing method, and a non-transitory computer-readable recording medium for consumer use, which allow users to operate easily and make it possible with a high degree of accuracy that synchronization of operations of plural apparatuses is controlled and data is obtained by plural sensor devices in synchronization with the operations of the plural apparatuses.

According to one aspect of the present invention, there is provided a wireless synchronous system including plural apparatuses and plural sensor devices, in which the plural apparatuses each comprise a first communicating unit for performing synchronous communication with the other apparatus, a first radio synchronizing-signal generating unit for generating a first radio synchronizing signal having a predetermined cycle, the predetermined cycle being synchronized with a timing of the synchronous communication performed by the first communicating unit, a synchronizing-signal generating unit for generating a synchronizing signal having a predetermined cycle, the predetermined cycle being synchronized with the first radio synchronizing signal generated by the first radio synchronizing-signal generating unit, and a controlling unit for determining a controlling timing of controlling the apparatus in accordance with the synchronizing signal generated by the synchronizing-signal generating unit, and the plural sensor devices each comprise a second communicating unit for performing synchronous communication with at least one of the plural apparatuses, a second radio synchronizing-signal generating unit for generating a second radio synchronizing signal having a predetermined cycle, the predetermined cycle being synchronized with a timing of the synchronous communication performed by the second communicating unit, a sensor unit for obtaining detection-data representing a state of the sensor device, and a detection-data obtaining controlling unit for determining a timing, at which the sensor unit obtains the detection-data, in accordance with the second radio synchronizing signal generated by the second radio synchronizing-signal generating unit.

According to other aspect of the invention, there is provided a wireless apparatus, which comprises a communicating unit for performing synchronous communication with other apparatus, a radio synchronizing-signal generating unit for generating a radio synchronizing signal having a predetermined cycle, the predetermined cycle being synchronized with a timing of the synchronous communication performed by the communicating unit, a synchronizing-signal generating unit for generating a synchronizing signal having a predetermined cycle, the predetermined cycle being synchronized with the radio synchronizing signal generated by the radio synchronizing-signal generating unit, and a controlling unit for determining a controlling timing of controlling the wireless apparatus in accordance with the synchronizing signal generated by the synchronizing-signal generating unit.

According to other aspect of the invention, there is provided a sensor device, which comprises a communicating unit for performing synchronous communication with other wireless apparatus, a radio synchronizing-signal generating unit for generating a radio synchronizing signal having a predetermined cycle, the predetermined cycle being synchronized with a timing of the synchronous communication by the communicating unit, a sensor unit for obtaining detection-data representing a state of the sensor device, and a detection-data obtaining controlling unit for determining a timing, at which the sensor unit obtains the detection-data, in accordance with the radio synchronizing signal generated by the radio synchronizing-signal generating unit.

According to still other aspect of the invention, there is provided a method of implementing wireless synchronization among plural apparatuses and plural sensor devices, including a first synchronizing method in each of the plural apparatuses and a second synchronizing method in each of the plural sensor devices, wherein the first synchronizing method in the apparatus comprises a first communicating step of performing synchronous communication with the other apparatus, a first radio synchronizing-signal generating step of generating a first radio synchronizing signal having a predetermined cycle, the predetermined cycle being synchronized with a timing of the synchronous communication at the first communicating step, a synchronizing-signal generating step of generating a synchronizing signal having a predetermined cycle, the predetermined cycle being synchronized with the first radio synchronizing signal generated at the first radio synchronizing-signal generating step, and a controlling step of determining a controlling timing of controlling the apparatus in accordance with the synchronizing signal generated at the synchronizing-signal generating step, and the second synchronizing method in the sensor device comprises a second communicating step of performing synchronous communication with at least one of the plural apparatuses, a second radio synchronizing-signal generating step of generating a second radio synchronizing signal having a predetermined cycle, the predetermined cycle being synchronized with a timing of the synchronous communication at the second communicating step, a sensor step of obtaining detection-data representing a state of the sensor device, and a detection-data obtaining controlling step of determining a timing, at which the sensor unit obtains the detection-data, in accordance with the second radio synchronizing signal generated at the second radio synchronizing-signal generating step.

According to yet another aspect of the invention, there is provided a non-transitory computer-readable recording medium storing a computer program, the computer program, when installed on a computer provided on an apparatus, making the computer function as a communicating unit for performing synchronous communication with other wireless apparatus, a radio synchronizing-signal generating unit for generating a radio synchronizing signal having a predetermined cycle, the predetermined cycle being synchronized with a timing of the synchronous communication performed by the communicating unit, a synchronizing-signal generating unit for generating a synchronizing signal having a predetermined cycle, the predetermined cycle being synchronized with the radio synchronizing signal generated by the radio synchronizing-signal generating unit, and a controlling unit for determining a controlling timing of controlling the apparatus in accordance with the synchronizing signal generated by the synchronizing-signal generating unit.

According to still another aspect of the invention, there is provided a non-transitory computer-readable recording medium storing a computer program, the computer program, when installed on a computer provided on a sensor device, making the computer function as a communicating unit for performing synchronous communication with other wireless apparatus, a radio synchronizing-signal generating unit for generating a radio synchronizing signal having a predetermined cycle, the predetermined cycle being synchronized with a timing of the synchronous communication performed by the communicating unit, a sensor unit for obtaining detection-data representing a state of the sensor device, and a detection-data obtaining controlling unit for determining a timing, at which the sensor unit obtains the detection-data, in accordance with the radio synchronizing signal generated by the radio synchronizing-signal generating unit.

The wireless synchronous system, radio apparatuses, sensor devices, wireless synchronizing method, and the computer-readable recording medium provided by the present invention allow the users to synchronize the operations of plural apparatuses and obtain data using the plural sensor devices in a simple manner with a high degree of accuracy.

DETAILED DESCRIPTION OF THE PREFERRED EMBODIMENTS

Now, the embodiments of the present invention will be described with reference to the accompanying drawings in detail.

[Configuration of Radio Synchronization System]

Figure 1:
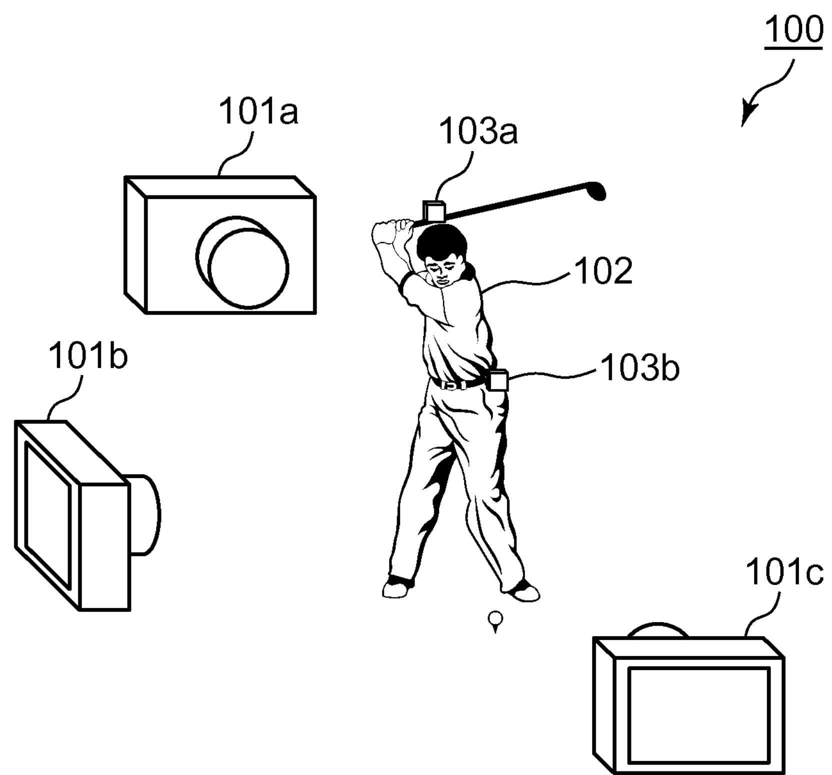
FIG. 1 is a view for explaining a radio synchronization system according to the embodiment of the present invention.

FIG. 1 is a view for explaining a radio synchronization system according to the embodiment of the present invention. As shown in FIG. 1, the radio synchronization system 100 comprises plural high-speed cameras 101*a*, 101*b*, 101*c*, and plural sensor devices 103*a*, 103*b*. In the radio synchronization system 100, the plural high-speed cameras 101*a*, 101*b*, 101*c* are wirelessly synchronized with each other for shooting an object 102 at high speed and/or the plural sensor devices 103*a*, 103*b* are attached on the object 102 and wirelessly synchronized with each other for obtaining data (directions of movement and accelerations). Further, the plural high-speed cameras 101*a*, 101*b*, 101*c*, and the plural sensor devices 103*a*, 103*b* are also wirelessly synchronized for shooting the object 102 at high speed as well as obtaining sensor data in synchronization with the shooting operation.

The radio synchronization system 100 is effectively and widely used by many athletes, including golfers, baseball players, and other sport players. The plural high-speed cameras 101*a*, 101*b*, 101*c* are used to take pictures of the object (player) 102 to obtain images taken from plural camera angles. Further, the plural sensor devices 103*a*, 103*b* are used to obtain sensor data taken from the player 102 and sensor data taken from equipment (game, gear and so on) used by the player 102. These images (pickup images) and sensor data are correlated with each other and recorded. The recorded images and sensor data are used for analyzing the player's motion such as a swinging form or motion and ball-striking form. Hereinafter, sometimes the plural high-speed cameras 101*a*, 101*b*, 101*c* are collectively referred to as the "high-speed cameras" 101, and the plural sensor devices 103*a*, 103*b* are also collectively referred to as the "sensor devices" 103.

Figure 2:
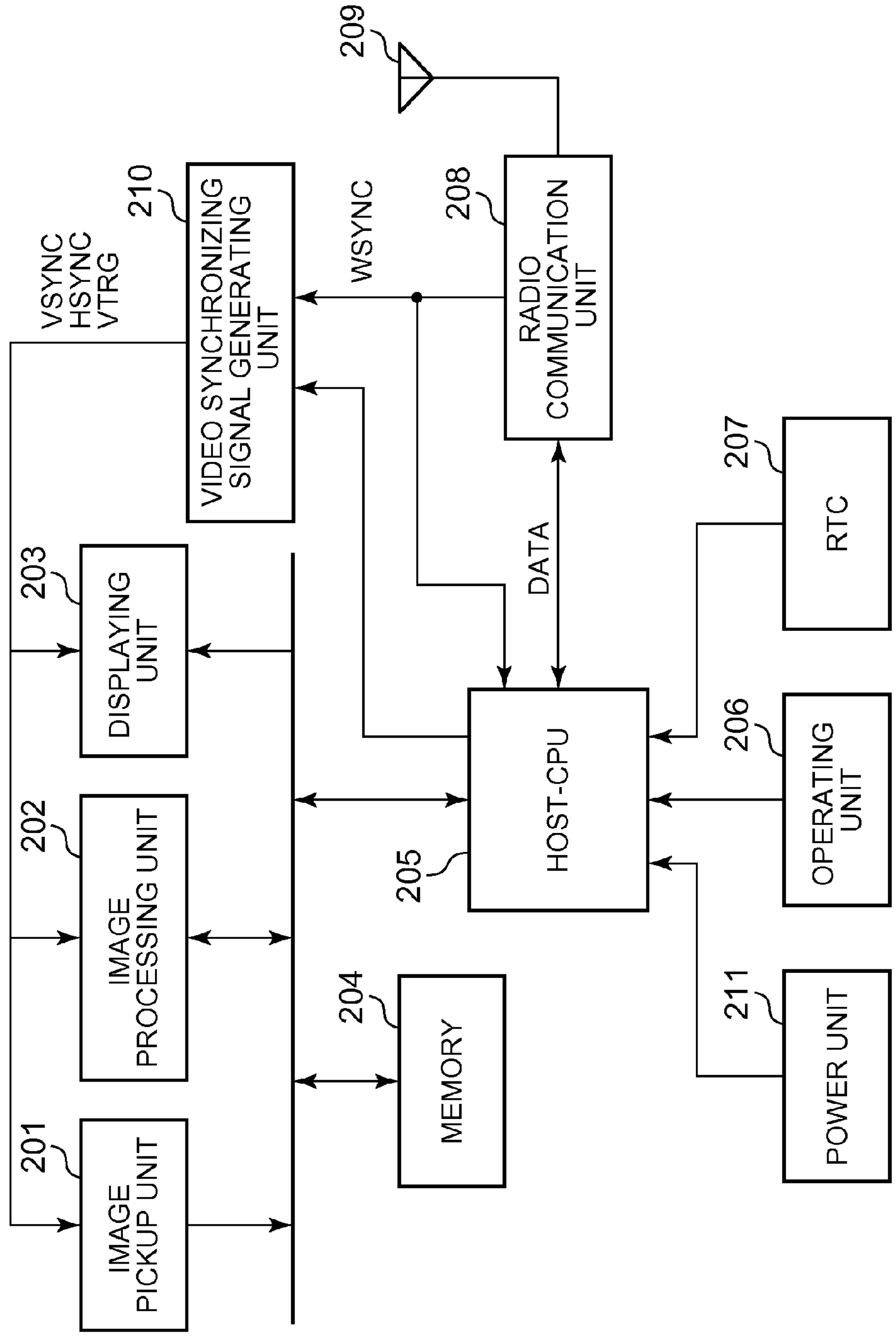
FIG. 2 is a block diagram of a configuration of a high-speed camera according to the present embodiment of the invention.

FIG. 2 is a block diagram showing a configuration of each of the high-speed cameras 101 according to the present embodiment of the invention. As shown in FIG. 2, the high-speed cameras 101 each comprise an image pickup unit 201, an image processing unit 202, a displaying unit 203, a memory 204, HOST-CPU 205, an operating unit 206, RTC (Real Time Clock) 207, a radio communication unit 208, an antenna 209, a video synchronizing signal generating unit 210, and a power unit 211.

The image pickup unit 201 is provided with an optical lens unit (not shown) and an image sensor (not shown). The optical lens unit consists of collecting lenses, including a focus lens and a zoom lens for taking a picture. The focus lens serves to form an optical image of an object on an acceptance surface of the image sensor. The zoom lens serves to change a focusing distance freely within a predetermined range.

The image sensor consists of a photoelectric conversion element and AFE (Analog Front End). The photoelectric conversion element consists of, for example, an element of a CMOS (Complementary Metal Oxide Semiconductor) type. The optical image of the object (player) 102 enters onto the photoelectric conversion element through the optical lens unit. The photoelectric conversion element performs various signal processes on the optical image of the object based on video synchronizing signals "VSYNC", "HSYNC", "VTRG", thereby outputting digital image data. The signal processes include a photoelectric conversion process (image-pickup process) and A/D (Analog/Digital) conversion process.

The image processing unit 202 consists of DSP (Digital Signal Processor) and VRAM (Video Random Access Memory). The image processing unit 202 cooperates with HOST-CPU 205 to perform various sorts of image processing on the image data. For example, the image processing unit 202 performs the image processing, including a noise-reduction process, a white-balancing process and a camera-shake correcting process, on the image data sent from the image pickup unit 201.

The displaying unit 203 has a liquid crystal displaying device for displaying various images thereon. The memory 204 is a sort of storing device, consisting of a non-volatile memory device, such as SD memory cards (Registered Trademark). The memory 204 serves to store the image data sent from the image processing unit 202. Further, the memory 204 stores various sorts of data used in the processing performed by the image processing unit 202. Furthermore, the memory 204 stores the sensor data of the sensor device 103 in synchronization with the image data.

HOST-CPU 205 runs a predetermined program to control operations of the video synchronizing signal generating unit 210, the image pickup unit 201, the image processing unit 202, the displaying unit 203, and the memory 204, thereby performing various processes. At this time, HOST-CPU 205 controls the operations of the respective units based on a radio synchronizing signal "WSYNC" supplied from the radio communication unit 208. The radio communication unit 208 is wirelessly connected with the corresponding radio communication units provided in the other ("n" units of) high-speed cameras and synchronized with them by means of the radio synchronous communication.

The radio synchronizing signal "WSYNC" is generated among other high-speed cameras and sensor devices by means of the radio synchronous communication. Therefore, HOST-CPU 205 can make the high-speed camera 101*a* shoot a moving image (or high-speed continuous shooting) and/or play back the moving image in synchronization with other high-speed cameras 101*b*, 101*c*. Similarly, HOST-CPU 205 can make the sensor device 103*a* obtain sensor data in synchronization with the other sensor device 103*b*. The radio synchronizing signal "WSYNC" will be described in detail later.

HOST-CPU 205 synchronizes a real time counted by RTC 207 with the radio synchronizing signal "WSYNC", thereby sharing the synchronized real time with the other wirelessly connected high-speed cameras 101*b*, 101*c* and sensor devices 103. In other words, HOST-CPU 205 can record the pickup image correlated with the synchronized real time, which is shared with the other high-speed cameras 101*b*, 101*c* and the sensor devices 103.

When playing back the moving image, HOST-CPU 205 can playback based on the radio synchronizing signal "WSYNC" supplied from the radio communication unit 208, the moving image, which has been shot in synchronization with the other high-speed cameras 101*b*, 101*c* and/or the sensor device 100. More specifically, an image to be played back among the sensor data recorded in the memory 204 and the sensor data related in time can be displayed simultaneously.

HOST-CPU 205 receives sensor data "DATA" from the sensor device 103 through the radio communication unit 208, and correlates the sensor data "DATA" with the shot moving image to record them in the memory 204.

The operating unit 206 comprises various buttons including a shutter button. The operating unit 206 serves to receive a user's instruction. RTC 207 counts the real time. The radio communication unit 208 performs the radio synchronous communication (existing communication method) with the other high-speed cameras 101*b*, 101*c* and/or the sensor devices 103 through the antenna 209, thereby exchanging data with them. Particularly in the present embodiment, the radio communication unit 208 outputs the radio synchronizing signal "WSYNC", which is synchronized with the radio synchronizing signals generated by the corresponding (or "n" units of) radio communication units wirelessly connected with said radio communication unit 208.

The video synchronizing signal generating unit 210 generates the video synchronizing signals "VSYNC", "HSYNC", "VTRG", which are synchronized with the radio synchronizing signal "WSYNC", and supplies the generated synchronizing signals to the image pickup unit 201, the image processing unit 202, and the displaying unit 203. The image pickup unit 201 obtains a pickup image in accordance with the video synchronizing signals "VSYNC", "HSYNC", "VTRG". Therefore, the image pickup unit 201 can obtain the pickup image synchronized with those obtained by the corresponding (or "n" units of) image pickup units, which are wirelessly connected with said image pickup unit 201. The power unit 211 consists of a secondary battery, and supplies power to various units within the high-speed cameras 101.

Figure 3:
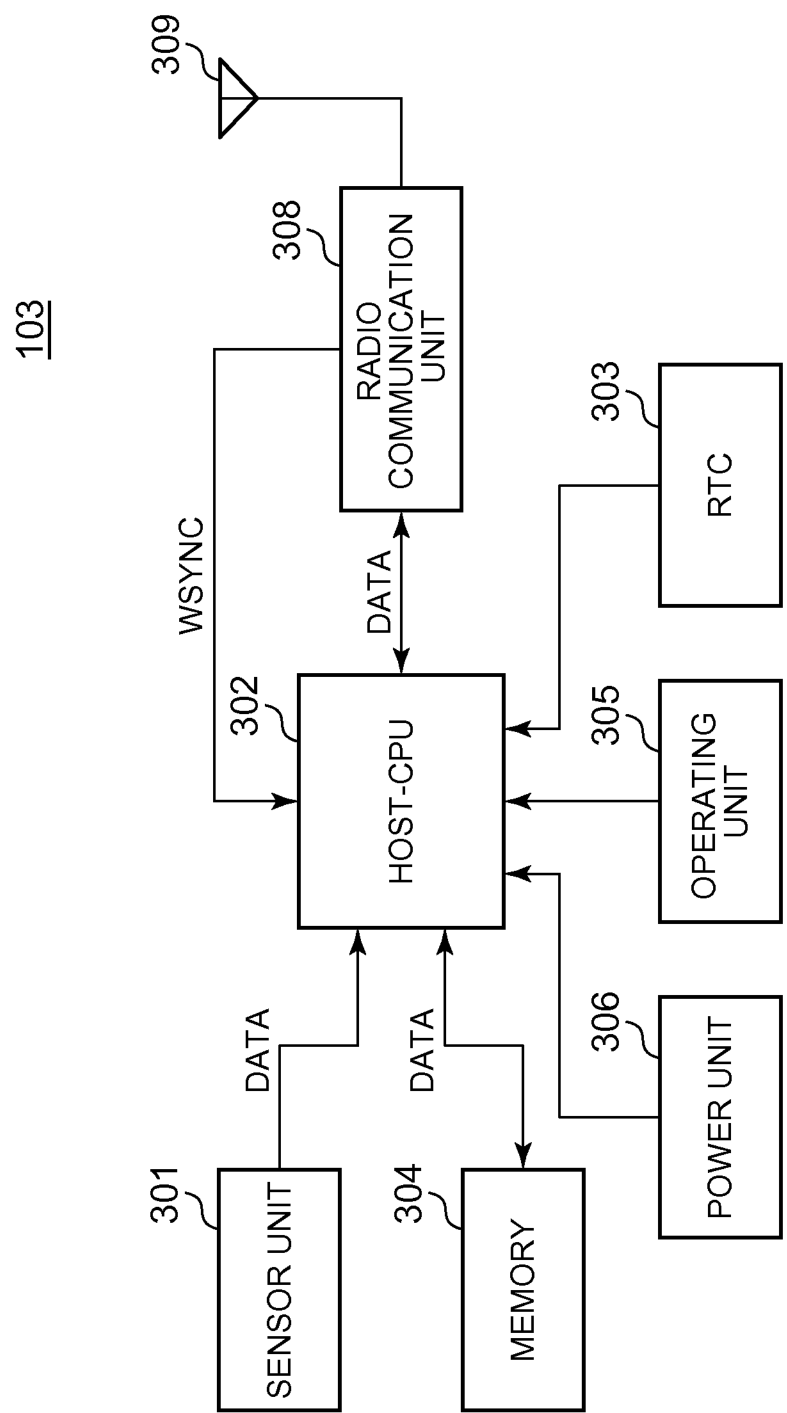
FIG. 3 is a block diagram of a configuration of a sensor device according to the present embodiment of the invention.

FIG. 3 is a block diagram of a configuration of the sensor device 103 according to the present embodiment of the invention. As shown in FIG. 3, the sensor device 103 comprises a sensor unit 301, HOST-CPU 302, RTC 303, a memory 304, an operating unit 305, a power unit 306, a radio communication unit 308, and an antenna 309.

The sensor unit 301 consists of, for example, a three axial acceleration-sensor and a three axial gyro-sensor, which output the sensor data "DATA" at predetermined time intervals. HOST-CPU 302 receives the sensor data "DATA" from the sensor unit 301 in synchronization with the radio synchronizing signal "WSYNC" of the radio communication unit 308, and stores the received sensor data "DATA" in the memory 304. Similarly to those generated in the high-speed cameras 101, the radio synchronizing signal "WSYNC" is also produced based on the synchronous communication, among the other high-speed cameras 101 and sensor devices 103 wirelessly connected through the radio synchronous communication.

HOST-CPU 302 synchronizes the real time counted by RTC 303 with the radio synchronizing signal "WSYNC", thereby sharing the synchronized real time with the other high-speed cameras 101 and sensor devices 103 wirelessly connected with the camera 101*a*. In other words, HOST-CPU 302 can obtain and record the sensor data "DATA" correlated with the real time, which is synchronized with the other high-speed cameras 101 and sensor devices 103.

Further, HOST-CPU 302 sends the sensor data "DATA" to the other high-speed cameras 101 and sensor devices 103 in synchronization with the radio synchronizing signal "WSYNC" of the radio communication unit 308 through the radio communication unit 308.

RTC 303 counts the real time. The memory 304 is a sort of storing device and consists of a Flash memory. The memory 304 stores the sensor data "DATA" correlated with the real time and also various sorts of data necessary in the processes to be performed by the HOST-CPU 302. The operating unit 305 comprises various buttons including a power button. The operating unit 305 serves to receive the user's instruction. The power unit 306 consists of a secondary battery, and supplies power to various units within the sensor device 103.

The radio communication unit 308 performs the radio synchronous communication with the other high-speed cameras 101 and/or the other sensor devices 103 through the antenna 309, thereby exchanging data with them. Particularly in the present embodiment, similarly to the radio communication unit 208 in the high-speed camera 101, the radio communication unit 308 outputs the radio synchronizing signal "WSYNC", which is synchronized with the radio synchronizing signals generated by the corresponding (or "n" units of) radio communication units wirelessly connected with said radio communication unit 308.

Figure 4:
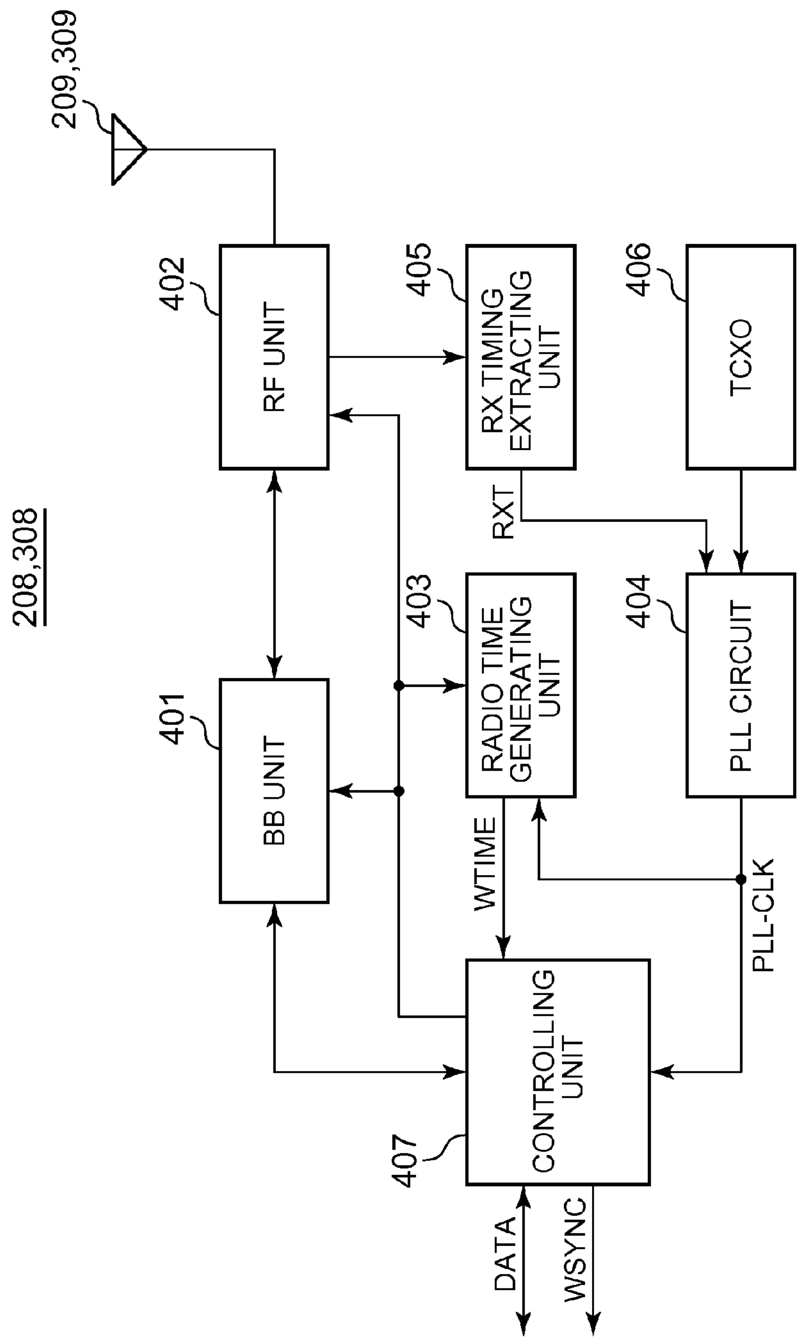
FIG. 4 is a block diagram of a configuration of a radio communication unit used in the high-speed camera and sensor device according to the present embodiment of the invention.

FIG. 4 is a block diagram of a configuration of the radio communication unit 208 according to the present embodiment of the invention. The radio communication unit 308 has the same configuration as the radio communication unit 208 and therefore the configuration thereof will not be described separately. As shown in FIG. 4, the radio communication unit 208 comprises BB (Base Band) unit 401, RF (Radio Frequency) unit 402, a radio time generating unit 403, PLL (Phase Locked Loop) circuit 404, RX timing extracting unit 405, TCXO (Temperature Compensated Crystal Oscillator) 406, and a controlling unit 407. The radio communication units 208, 308 have a master mode and a slave mode.

BB unit 401 performs a process on an un-modulated base-band signal and a modulated base-band signal. RF unit 402 receives a radio frequency signal through the antenna 209 (309), and modulates or demodulates the received radio frequency signal. Further, RF unit 402 supplies the received radio frequency signal to BB unit 401 and RX timing extracting unit 405. The radio time generating unit 403 operates in accordance with "PLL-CLK" supplied from PLL circuit 404, and has a timer of more than several hours, counting the radio time and outputting the counted radio time "WTIME".

For instance, when it is presumed that the timer of the radio time generating unit 403 consists of a 24-bit counter and the "PLL-CLK" is 1 millisecond, then one cycle of the clock will be 4.66 hours. In this case, the radio time "WTIME" output from the radio time generating unit 403 will be the 24-bit data having a value falling within a range of (000000~FFFFFF) in the hexagonal expression. In the synchronous communication of a frequency-hopping type, when the master apparatus and the slave apparatus are linked together, the radio time "WTIME" is sent from the master apparatus to the slave apparatus. Then, the clock of the slave apparatus is synchronized in phase by means of "PLL-CLK", and the radio time "WTIME" is shared between the master and slave apparatuses, whereby the frequency to be hopped next is uniquely determined based on the radio time "WTIME" both in the master and slave apparatuses. Therefore, as far as the master and slave apparatuses share the current time and are linked together based on the radio time "WTIME", a completely coincident time is maintained both in the master and slave apparatuses.

In the master mode, PLL circuit 404 operates in accordance with a high-precision clock signal supplied from TCXO 406 to output the clock "PLL-CLK" synchronized with TCXO 406. In the slave mode, PLL circuit 404 is controlled its operation timing in accordance with a receipt-timing signal "RXT" supplied from RX timing extracting unit 405, and outputs the clock "PLL-CLK" synchronized with the receipt-timing signal "RXT". The clock "PLL-CLK" contains allowable fine jitters (around 10 micro seconds).

In the slave mode, RX timing extracting unit 405 receives a signal from RF unit 402 and extracts the receipt-timing signal "RXT" from the received signal to supply the same signal "RXT" to PLL circuit 404. TCXO 406 supplies the high-precision clock signal to PLL circuit 404.

The controlling unit 407 supplies BB unit 401 with the data "DATA" to be sent thereto and receives the received data "DATA" from BB unit 401. The controlling unit 407 controls the operations of the BB unit 401, RF unit 402, and the radio time generating unit 403. The controlling unit 407 generates the radio synchronizing signal "WSYC" based on the clock "PLL-CLK" supplied from PLL circuit 404 and the radio time "WTIME" supplied from the radio time generating unit 403. This radio synchronizing signal "WSYC" is used to synchronize with the other apparatuses, which are connected by the radio synchronous communication.

More particularly, the radio communication unit 208 (308) fixes the synchronization of the clock "PLL-CLK" as well as the synchronization of the radio time "WTIME" through the negotiation for establishing the synchronous communication with the corresponding (or "n" unit of) radio communication units. After the synchronous communication has been established between the radio communication units, the controlling unit 407 generates the radio synchronizing signal "WSYC" of a predetermined cycle at a predetermined rising timing, based on the clock "PLL-CLK" supplied from PLL circuit 404 and the radio time "WTIME" supplied from the radio time generating unit 403.

In the master mode, both the radio frequency signal output from RF unit 402 and the radio synchronizing signal "WSYC" output from the controlling unit 407 are controlled in their outputting timings by the clock "PLL-CLK", which is synchronized with the high-precision clock signal supplied from the TCXO 406. Meanwhile, in the slave mode, both the radio frequency signal output from RF unit 402 and the radio synchronizing signal "WSYC" output from the controlling unit 407 are controlled in their outputting timings by the clock "PLL-CLK", which is synchronized with the receipt-timing signal "RXT". One radio communication unit set in the master mode can be wirelessly connected with plural radio communication units set in the slave mode.

Figure 5A:
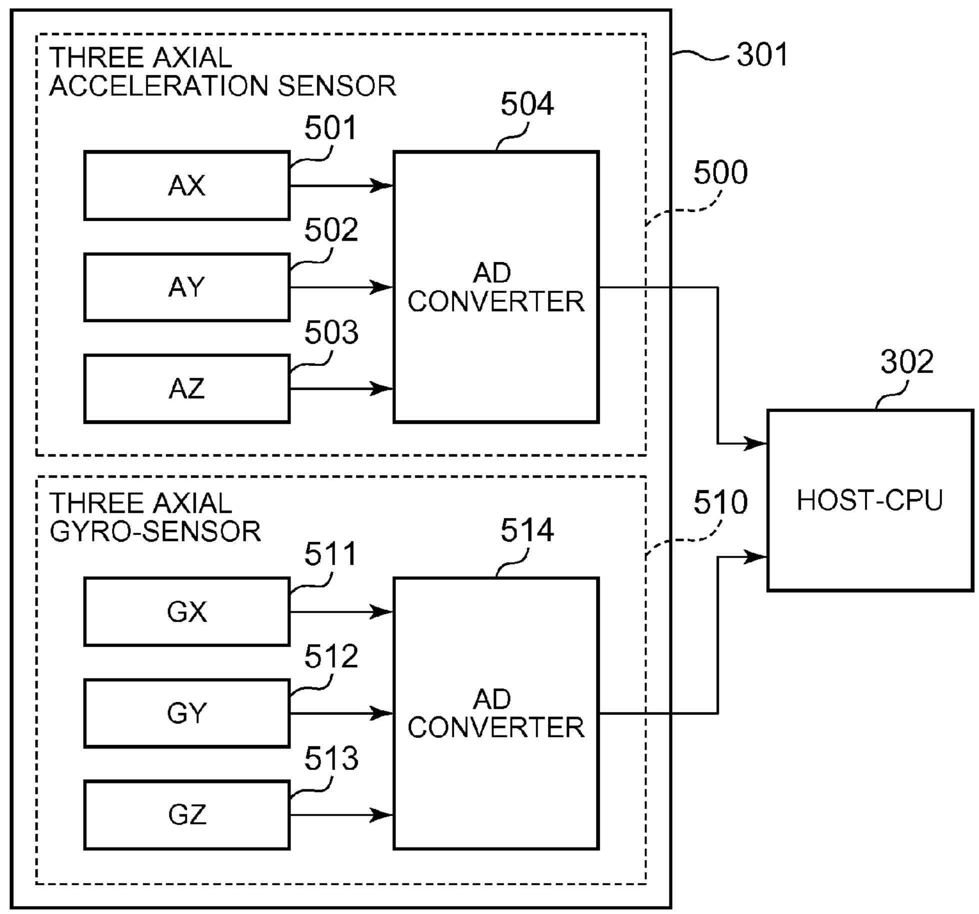
FIG. 5*a* is a block diagram of a configuration of a sensor unit used in the sensor device according to the embodiment of the invention.
Figure 5B:
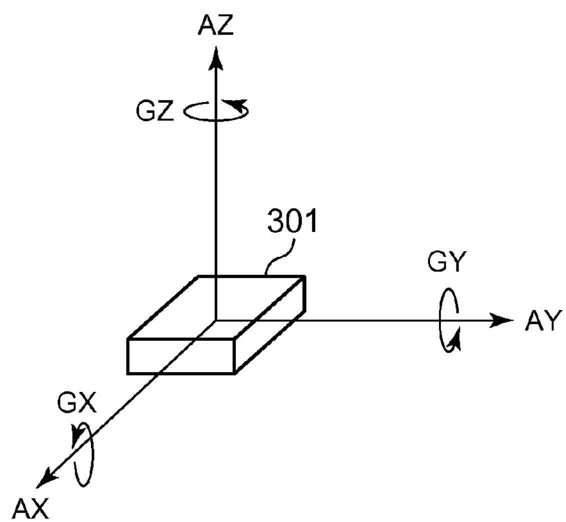
FIG. 5*b* is a conceptual diagram for explaining relationships between sensor data and operating directions of the sensor device.

FIG. 5*a* is a block diagram of a configuration of the sensor unit 301 used in the sensor device 103 according to the embodiment of the invention. FIG. 5*b* is a conceptual diagram for explaining relationships between the sensor data and operating directions of the sensor device 103. The sensor unit 301 consists of, for example, a three axial acceleration sensor 500 and a three axial gyro-sensor 510. The sensor device 103 is attached on the arm, leg and/or the body of the player (object) and on the equipment (golf club, tennis racket, baseball bat and the like) held by the player.

The three axial acceleration sensor 500 consists of sensor elements 501, 502, 503 and AD converter 504. The sensor elements 501, 502, and 503 detect accelerations respectively in the directions of AX, AY, and AZ, when the object or the equipment moves in a three dimensional space, as shown in FIG. 5*b*. AD converter 504 converts signals outputs from the sensor elements 501, 502, 503 into digital data, and supplies the digital data to HOST-CPU 302.

The three axial gyro-sensor 510 consists of sensor elements 511, 512, 513 and AD converter 514. The sensor elements 511, 512, and 513 detect angular rates respectively in the directions of AX, AY, and AZ, when the object or the equipment turns in the three dimensional space, as shown in FIG. 5*b*. AD converter 504 converts signals outputs from the sensor elements 511, 512, 513 into digital data, and supplies the digital data to HOST-CPU 302.

HOST-CPU 302 obtains the data "DATA" from the sensor unit 301 in synchronization with the synchronizing signal "WSYNC". Meanwhile, even if the data "DATA" has been obtained out of synchronization, the data "DATA" will be managed (stored or sent) together with time information synchronized with the synchronizing signal "WSYNC" at the time when said data "DATA" has been obtained.

Figure 6:
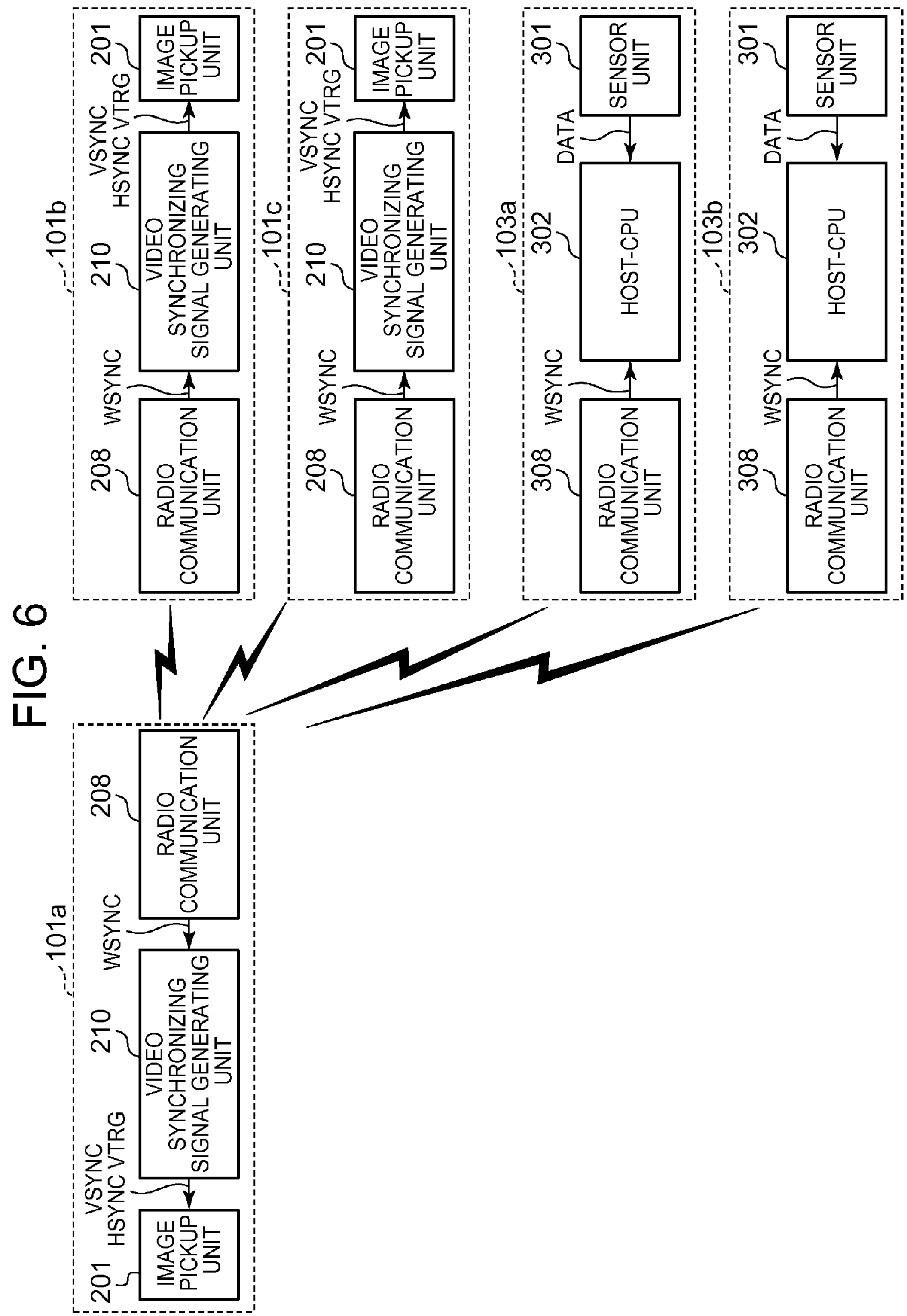
FIG. 6 is a block diagram of a schematic configuration of the radio synchronization system according to the present embodiment of the invention.

FIG. 6 is a block diagram of a schematic configuration of the radio synchronization system 100 according to the present embodiment of the invention. As shown in FIG. 6, the radio synchronization system 100 establishes a framework of a star type, comprising one master apparatus (high-speed camera 101*a*) and plural slave apparatuses (high-speed cameras 101*b*, 101*c*, and sensor devices 103*a*, 103*b*). The master apparatus or the high-speed camera 101*a* and the slave apparatuses or the high-speed cameras 101*b*, 101*c*, and the sensor devices 103*a*, 103*b* operate in synchronization with the radio synchronizing signals "WSYNC", which are produced by the radio communication units 208*a*, 208*b*, 208*c*, 308*a* and 308*b* in accordance with the synchronous communication.

In other words, when a user operates the master apparatus or the high-speed camera 101*a*, various sorts of setting information is transferred from the master apparatus or the high-speed camera 101*a* to the slave apparatuses or the high-speed cameras 101*b*, 101*c*, and the sensor devices 103*a*, 103*b*, wherein the setting information includes starting and finishing times of a shooting operation and obtaining sensor data, a shooting frame rate, a data obtaining rate, and the like.

In the high-speed cameras 101*a*, 101*b*, 101*c*, the video synchronizing signal generating unit 210*a*, 210*b*, 210*c* generate the video synchronizing signals "VSYNC", "HSYNC", "VTRG" in synchronization with the radio synchronizing signals "WSYNC" of the radio communication units 208*a*, 208*b*, 208*c*. The image pickup units 201*a*, 201*b*, 201*c* obtain pickup images in accordance with the video synchronizing signals "VSYNC", "HSYNC", "VTRG". In the sensor devices 103*a*, 103*b*, HOST-CPU 302*a*, 302*b* obtain the sensor data "DATA" from the sensor units 301*a*, 301*b* in synchronization with the radio synchronizing signals "WSYNC" of the radio communication units 308*a*, 308*b*.

The radio synchronization system 100 of the above described configuration allows the high-speed cameras 101*a*, 101*b*, 101*c* to perform the high-speed shooting operations in synchronization and also allows the sensor devices 103*a*, 103*b* to collect the sensor data "DATA" in synchronization. Further, since the high-speed cameras 101*a*, 101*b*, 101*c* and the sensor devices 103*a*, 103*b* operate in synchronization, it is possible to synchronize the pickup images obtained by the high-speed shooting operations of the high-speed cameras 101*a*, 101*b*, 101*c* with the sensor data "DATA" collected by the sensor devices 103*a*, 103*b*.

OPERATION OF EMBODIMENT

Hereinafter, the following synchronous operations will be described: A. Synchronous operation between the high-speed cameras 101 (synchronous shooting operation); B. Synchronous operation between the sensor devices 103 (synchronous sensor-data collection); C. Synchronous operation between the high-speed cameras 101 and the sensor devices 103 (synchronization of the shooting operation and the sensor-data collection); D. Synchronous operation between the high-speed cameras 101 and the sensor devices 103 (operation of correlating the sensor-data with a moving image); E. Synchronous operation between the high-speed cameras 101 (synchronous playing-back operation); and F. Synchronous operation between the high-speed cameras 101 and the sensor devices 103 (synchronous playing-back operation).

A. Synchronous Operation Between High-Speed Cameras (Synchronous Shooting Operation)

Figure 7:
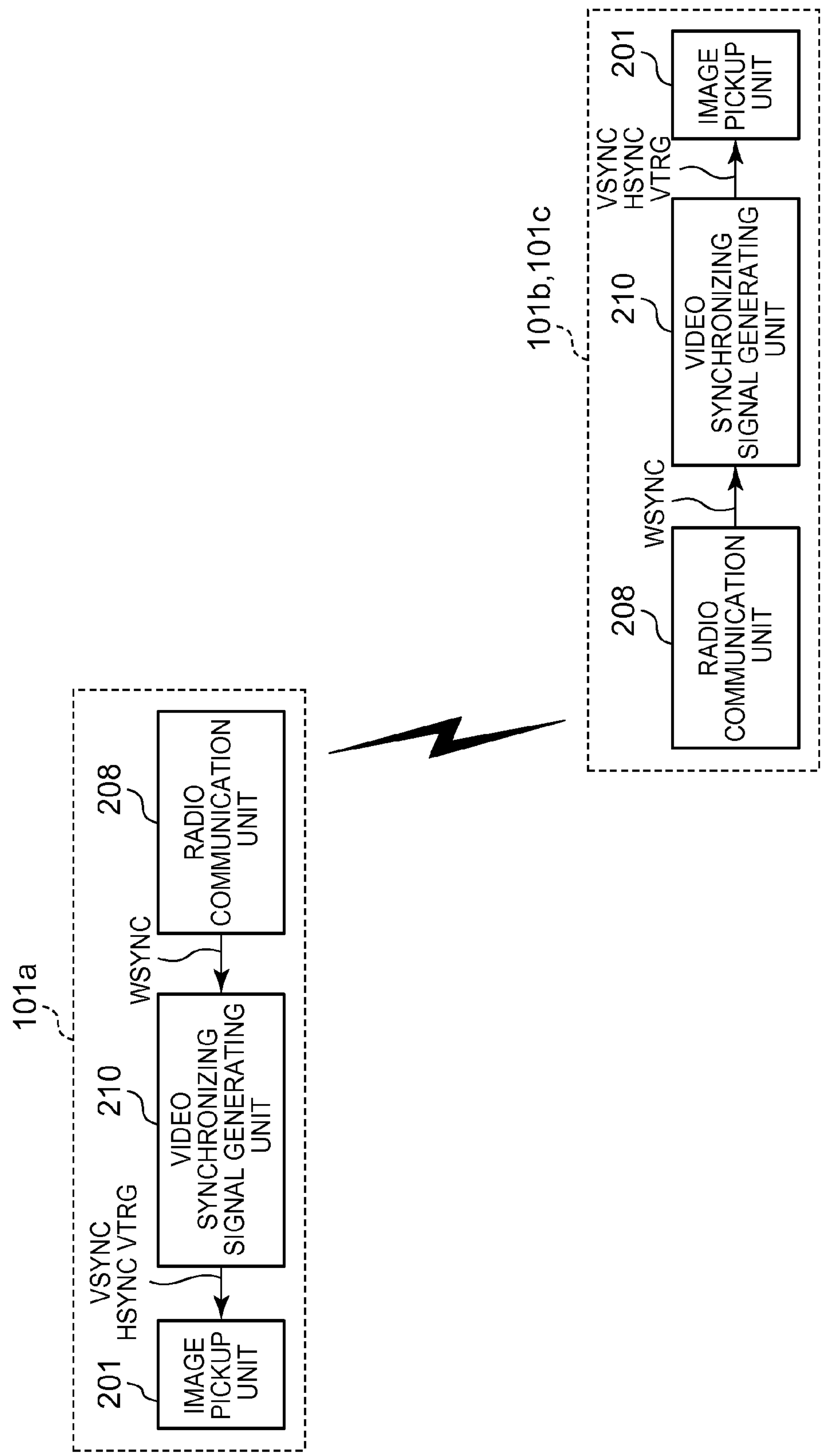
FIG. 7 is a conceptual diagram for explaining a synchronous operation (synchronous shooting operation) between the plural high-speed cameras according to the present embodiment of the invention.

FIG. 7 is a conceptual diagram for explaining the synchronous operation between the high-speed cameras 101 according to the present embodiment of the invention. In FIG. 7, only the elements are shown, which are required for performing the synchronous operation. In FIG. 7, the high-speed camera 101*a* operates as the master apparatus and the high-speed cameras 101*b*, 101*c* operate as the slave apparatuses.

In the high-speed camera 101*a*, the radio communication unit 208*a* outputs the radio synchronizing signal "WSYNC", which is synchronized in phase (or coincident at an edge timing) with the radio synchronous communication performed by the radio communication units 208*b*, 208*c* of the high-speed cameras 101*b*, 101*c*. The video synchronizing signal generating unit 210*a* generates the video synchronizing signals "VSYNC", "HSYNC", "VTRG" having a predetermined cycle and synchronized with the above radio synchronizing signal "WSYNC", wherein the generated video synchronizing signals are synchronized with those generated by the high-speed cameras 101*b*, 101*c*. The image pickup unit 201*a* shoots (records) a moving image synchronized with those to be shot by the other image pickup units 201*b*, 201*c* in accordance with the above video synchronizing signals "VSYNC", "HSYNC", "VTRG".

Meanwhile, similarly to the high-speed camera 101*a*, in the high-speed cameras 101*b*, 101*c*, the radio communication units 208*b*, 208*c* output the radio synchronizing signals "WSYNC", which are synchronized in phase (or coincident at the edge timing) with the radio synchronous communication performed by the radio communication unit 208*a* of the high-speed cameras 101*a*. The video synchronizing signal generating units 210*b*, 210*c* generate the video synchronizing signals "VSYNC", "HSYNC", "VTRG" having a predetermined cycle and synchronized with the above radio synchronizing signal "WSYNC", wherein the generated video synchronizing signals are synchronized with those generated by the high-speed cameras 101*a*. The image pickup units 201*b*, 201*c* shoot (record) moving images synchronized with the moving image to be shot by the high-speed camera 101*a* in accordance with the above video synchronizing signals "VSYNC", "HSYNC", "VTRG".

As a result, the high-speed camera 101*a* operating as the master apparatus and the high-speed cameras 101*b*, 101*c* operating as the slave apparatuses make the image pickup units 201*a*, 201*b*, 201*c* shoot moving images, which are synchronized in phase with each other (that is, the moving images, which are coincident in the horizontal and (or) vertical synchronizing signals), through operations of the radio communication units 208*a*, 208*b*, 208*c* and the image-synchronizing signal generating units 210*a*, 210*b*, 210*c*.

In the master apparatus or the high-speed camera 101*a* and the slave apparatuses or the high-speed cameras 101*b*, 101*c*, HOST-CPU 205*a*, 205*b*, 205*c* (not shown) synchronize the real times counted by RTC 207*a*, 207*b*, 207*c* (not shown) with the radio synchronizing signals "WSYNC", and correlate the real times with the moving images, respectively, whereby each HOST-CPU records the real time correlated with the moving image. As a result, the master apparatus or the high-speed camera 101*a* and the slave apparatuses or the high-speed cameras 101*b*, 101*c* each can simultaneously record the real time synchronized with the real time counted by the other cameras, together with the moving image.

B. Synchronous Operation Between Sensor Devices (Synchronous Sensor-Data Collection)

Figure 8:
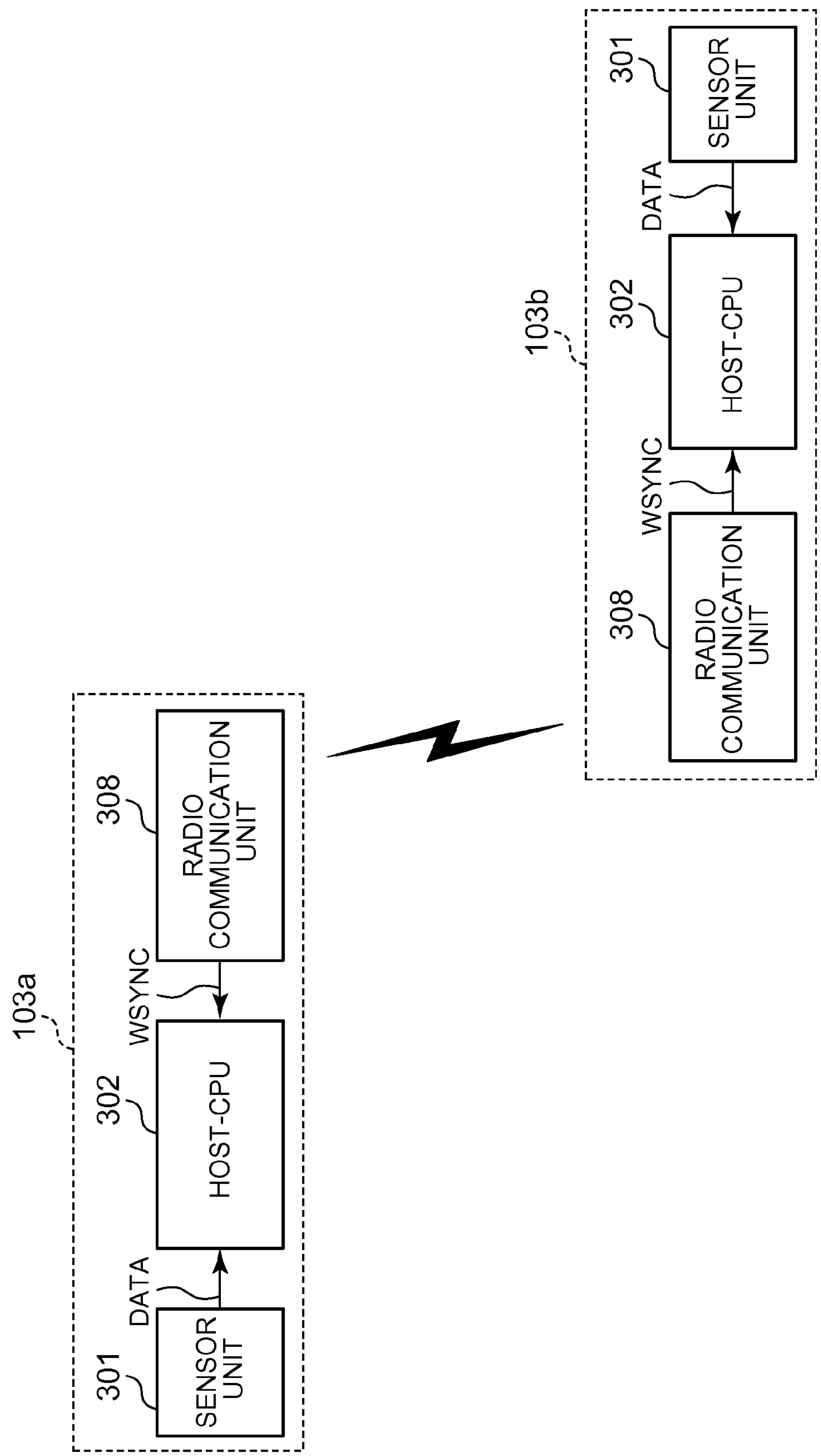
FIG. 8 is a conceptual diagram for explaining the synchronous operation (synchronous sensor-data collection) between the plural sensor devices according to the present embodiment of the invention.

FIG. 8 is a conceptual diagram for explaining the synchronous operation (synchronous sensor-data collection) between the sensor devices 103 according to the present embodiment of the invention. In FIG. 8, only the elements are shown, which are required for performing the synchronous operation between the sensor devices 103. In FIG. 8, the sensor device 103*a* operates as the master device and the sensor device 103*b* operates as the slave device.

In the sensor device 103*a*, the radio communication unit 308*a* outputs the radio synchronizing signal "WSYNC", which is synchronized in phase (or coincident at the edge timing) with the radio synchronous communication performed by the radio communication unit 308*b* of the sensor device 103*b*.

Meanwhile, similarly to the sensor device 103*a*, in the sensor device 103*b*, the radio communication unit 308*b* outputs the radio synchronizing signal "WSYNC", which is synchronized in phase (or coincident at the edge timing) with the radio synchronous communication performed by the radio communication unit 308*a* of the sensor device 103*a*. HOST-CPU 302*a*, 302*b* of the sensor devices 103*a*, 103*b* obtain and record the sensor data "DATA" from the sensor unit 301*a*, 301*b* in predetermined cycles synchronized with the above radio synchronizing signals "WSYNC", respectively.

As a result, in the sensor devices 103*a*, 103*b*, HOST-CPU 302*a*, 302*b* can obtain the sensor data "DATA", which is synchronized in phase (or, which is coincident in sensing timing) with the other sensor device, through the operations of the radio communication units 308*a*, 308*b*.

In the sensor devices 103*a*, 103*b*, HOST-CPU 302*a*, 302*b* synchronize the real times counted by RTC 303*a*, 303*b* (not shown) with the radio synchronizing signals "WSYNC" output from the radio communication units 308*a*, 308*b*, respectively, and correlate the synchronized real times with the obtained sensor data "DATA", thereby recording the sensor data "DATA" correlated with the synchronized real times. As a result, the sensor devices 103*a*, 103*b* can simultaneously record the sensor data "DATA" together with the real time synchronized with the real time counted by the other sensor device.

It is possible for HOST-CPU 302*a*, 302*b* to generate sensor synchronizing signals of a predetermined cycle, synchronized with the radio synchronizing signal "WSYNC", respectively, thereby obtaining the sensor data "DATA" from the sensor units 301*a*, 301*b* in synchronization with the sensor synchronizing signals and recording the obtained data, wherein the sensor synchronizing signal is a signal having a different cycle (integral multiple of cycle), and synchronized with the radio synchronizing signal "WSYNC".

C. Synchronous Operation Between High-Speed Cameras and Sensor Devices (Synchronization of Shooting Operation and Sensor-Data Collection)

Figure 9:
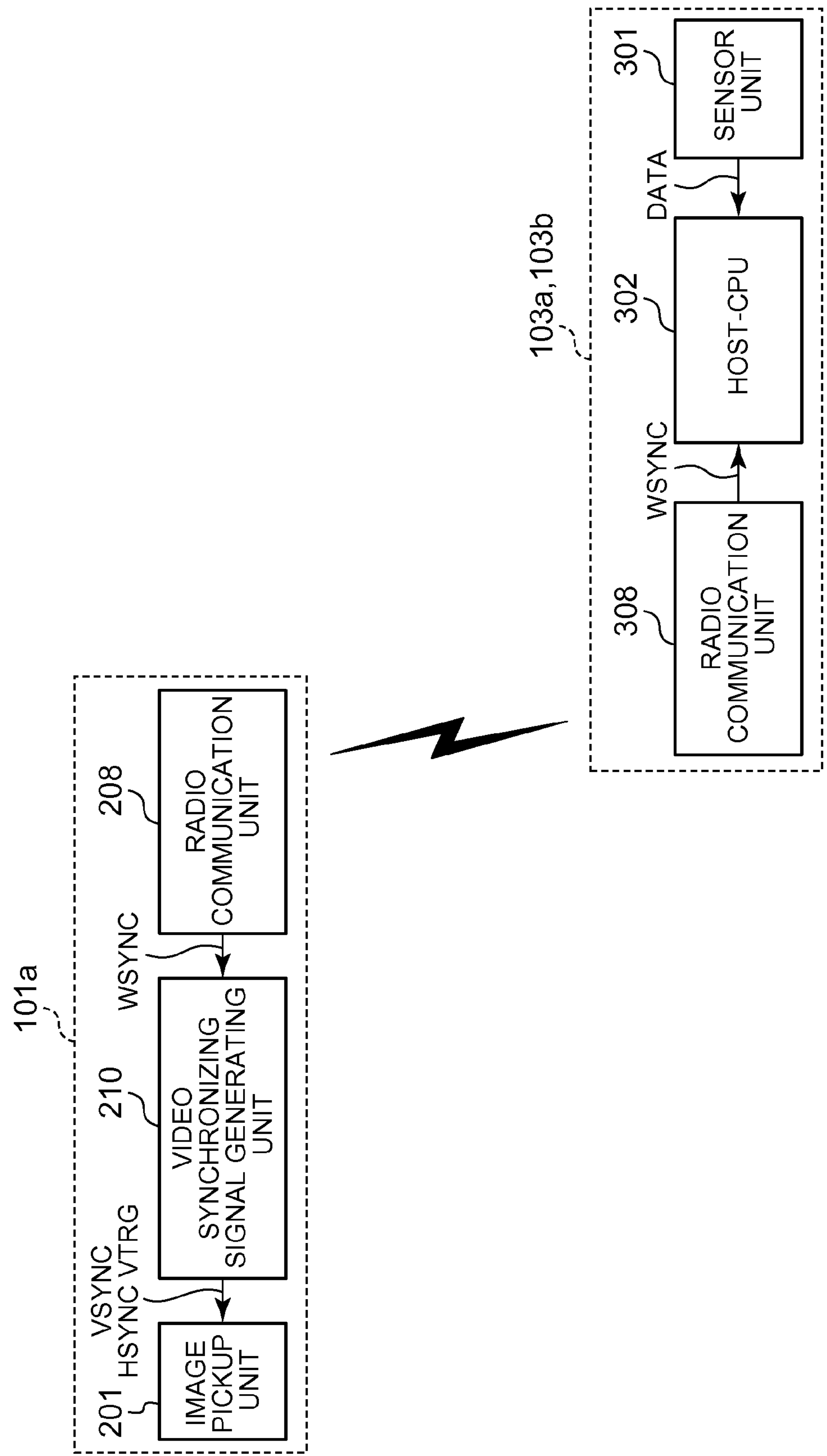
FIG. 9 is a conceptual diagram for explaining the synchronous operation (synchronous sensor-data collection) between the high-speed camera and the sensor devices according to the present embodiment of the invention.

FIG. 9 is a conceptual diagram for explaining the synchronous operation (synchronous sensor-data collection) between the high-speed camera 101*a* and the sensor devices 103 according to the present embodiment of the invention. In FIG. 9, the high-speed camera 101*a* operates as the master apparatus and the sensor devices 103*a*, 103*b* operate as the slave devices. The high-speed camera 101*a* operates substantially in the same manner as described in the section of "A. Synchronous Operation between High-speed Cameras (synchronous shooting operation)", and its further description will be omitted herein. The sensor devices 103*a*, 103*b* operate substantially in the same manner as described in the section of "B. Synchronous Operation between Sensor Devices (synchronous sensor-data collection)", and their further description will be omitted herein, too.

In this case, the high-speed camera 101*a* operates as the master apparatus, and the image pickup units 201*a* of the high-speed camera 101*a* can shoot a moving image, which is synchronized in phase with the sensor devices 103*a*, 103*b* (that is, the moving image, which is coincident in the horizontal and (or) vertical synchronizing signal), through operations of the radio communication unit 208*a* and the video synchronizing signal generating units 210*a*.

In the high-speed camera 101*a* operating as the master apparatus, HOST-CPU 205*a* (not shown) synchronizes the real time counted by RTC 207*a* (not shown) with the radio synchronizing signal "WSYNC", and correlates the real time with the moving image, recording the real time correlated with the moving image. As a result, the master apparatus or the high-speed camera 101*a* can record the real time synchronized with the sensor devices 103*a*, 103*b*, together with the moving image.

Further, in the sensor devices 103*a*, 103*b*, HOST-CPU 302*a*, 302*b* can obtain the sensor data "DATA", which is synchronized in phase (or, which is coincident in sensing timing) with the high-speed camera 101*a*, through the operations of the radio communication units 308*a*, 308*b*.

Further, in the sensor devices 103*a*, 103*b*, HOST-CPU 302*a*, 302*b* synchronize the real times counted by RTC 303*a*, 303*b* (not shown) with the radio synchronizing signal "WSYNC", and correlate the real times with the obtained sensor data "DATA", respectively, whereby each HOST-CPU records the real time correlated with the obtained sensor data "DATA". As a result, the sensor devices 103*a*, 103*b* can simultaneously record the real time synchronized in time with the high-speed camera 101*a*, together with the sensor data "DATA".

It is possible for HOST-CPU 302*a*, 302*b* to generate the sensor synchronizing signals of a predetermined cycle, synchronized with the radio synchronizing signal "WSYNC", respectively, thereby obtaining the sensor data "DATA" from the sensor units 301*a*, 301*b* in synchronization with the sensor synchronizing signals and recording the obtained data, wherein the sensor synchronizing signal is a signal having a different cycle (integral multiple of cycle), and synchronized with the radio synchronizing signal "WSYNC".

D. Synchronous Operation Between High-Speed Cameras and Sensor Devices (Operation of Correlating the Sensor-Data with the Moving Image)

Figure 10:
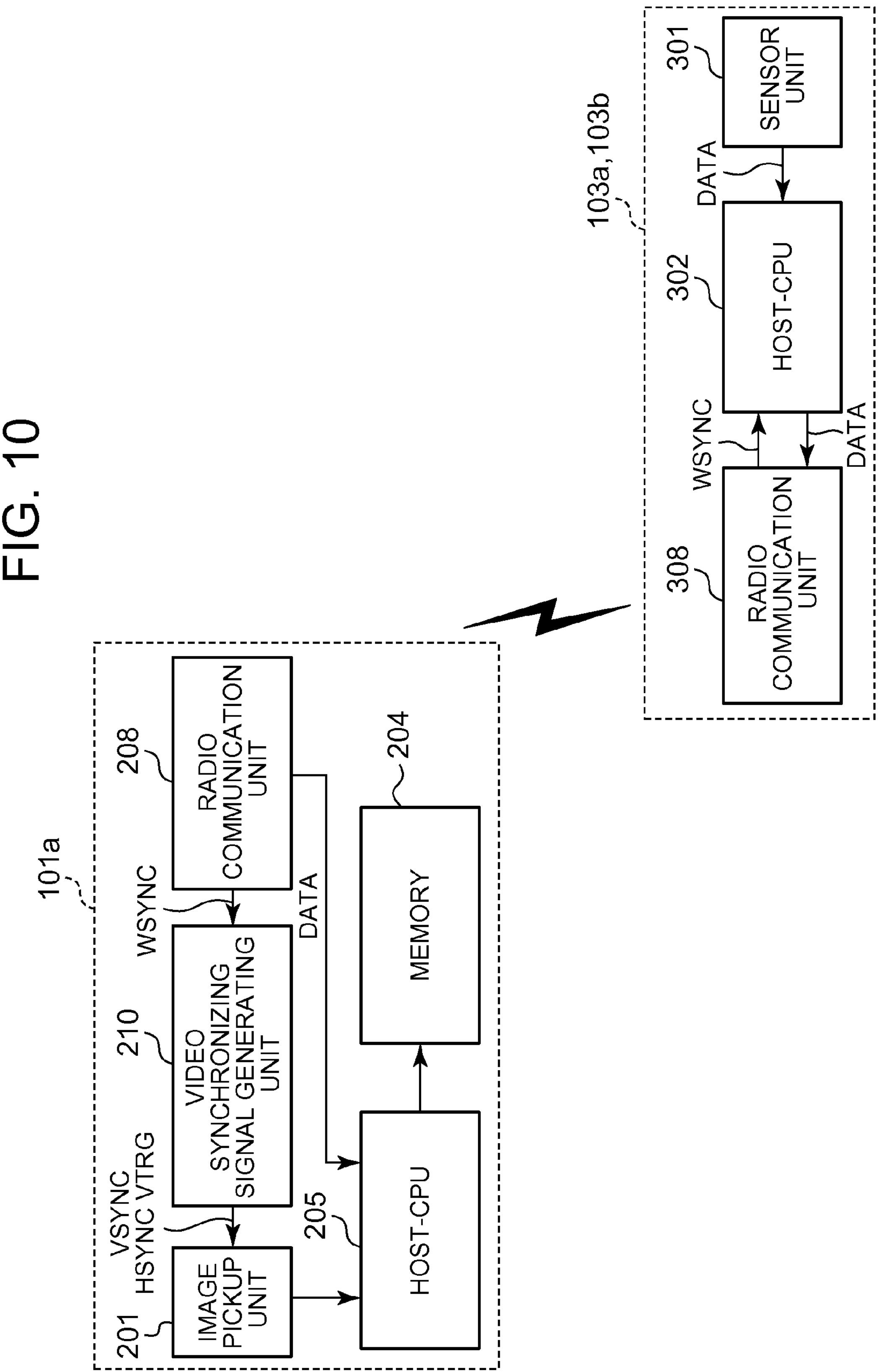
FIG. 10 is a conceptual diagram for explaining the synchronous operation (synchronous recording operation of pickup image and sensor data) between the high-speed cameras and the sensor devices according to the present embodiment of the invention.

FIG. 10 is a conceptual diagram for explaining the synchronous operation (synchronous recording operation of pickup image and sensor data) between the high-speed cameras 101 and the sensor devices 103 according to the present embodiment of the invention. In FIG. 10, the high-speed camera 101*a* operates as the master apparatus and the sensor devices 103*a*, 103*b* operate as the slave devices.

In the sensor devices 103*a*, 103*b*, HOST-CPU 302*a*, 302*b* synchronize the real times counted by RTC 303*a*, 303*b* (not shown) with the radio synchronizing signal "WSYNC", and correlate the real time with the obtained sensor data "DATA", recording the sensor data "DATA" correlated with the real time. Further, HOST-CPU 302*a*, 302*b* send the high-speed camera 101*a* the obtained sensor data "DATA" together with the correlated real time (data obtaining time) at a predetermined sending timing (or at a real time) through the radio communication units 308*a*, 308*b*. Or in response to a request from the high-speed camera 101*a*, HOST-CPU 302*a*, 302*b* send the high-speed camera 101*a* the obtained sensor data "DATA" together with the correlated real time (data obtaining time).

Meanwhile, in the high-speed camera 101*a*, the radio communication units 208*a* outputs the radio synchronizing signal "WSYNC", which is synchronized in phase (or coincident at the edge timing) with the radio synchronous communication performed by the radio communication units 308*a*, 308*b* of the sensor devices 103*a*, 103*b*. The video synchronizing signal generating unit 210*a* generates the video synchronizing signals "VSYNC", "HSYNC", "VTRG" having a predetermined cycle and synchronized with the above radio synchronizing signal "WSYNC", wherein the video synchronizing signals are synchronized with the sensor devices 103*a*, 103*b*. The image pickup units 201*a* shoots a moving image synchronized with the sensor data obtained by the sensor devices 103*a*, 103*b* in accordance with the above video synchronizing signals "VSYNC", "HSYNC", "VTRG".

HOST-CPU 205*a* synchronizes the real time counted by RTC 207*a* (not shown) with the radio synchronizing signal "WSYNC", and correlates the real time with the shot moving image, recording the moving image correlated with the real time in the memory 204*a*. Meanwhile, the radio communication unit 208*a* receives the sensor data "DATA" from the sensor devices 103*a*, 103*b*. HOST-CPU 205*a* compares the real times correlated with the moving images with the real time correlated with the sensor data "DATA", and records in the memory 204*a* the sensor data "DATA" together with the moving image (frame data), whose real time coincides with that of said sensor data "DATA".

As a result, the sensor devices 103*a*, 103*b* can send the high-speed camera 101*a* the sensor data "DATA" synchronized in phase at a sensing timing with the high-speed camera 101*a*, and the high-speed camera 101*a* operating as the master apparatus receives the sensor data "DATA" sent from plural sensor devices 103*a*, 103*b* to record the sensor data together with the moving image.

The high-speed camera 101*a* operating as the master apparatus can simultaneously record the real time synchronized in time with the sensor devices 103*a*, 103*b*, together with the moving image.

The sensor devices 103*a*, 103*b* operating as the slave devices can simultaneously record the real time synchronized in time with the high-speed camera 101*a* together with the sensor data "DATA".

The high-speed camera 101*a* operating as the master apparatus can record the sensor data "DATA" obtained from the sensor devices 103*a*, 103*b*, together with the moving image (frame data), whose real time coincides with the real time of said sensor data "DATA".

E. Synchronous Operation Between High-Speed Cameras (Synchronous Playing-Back Operation)

Figure 11:
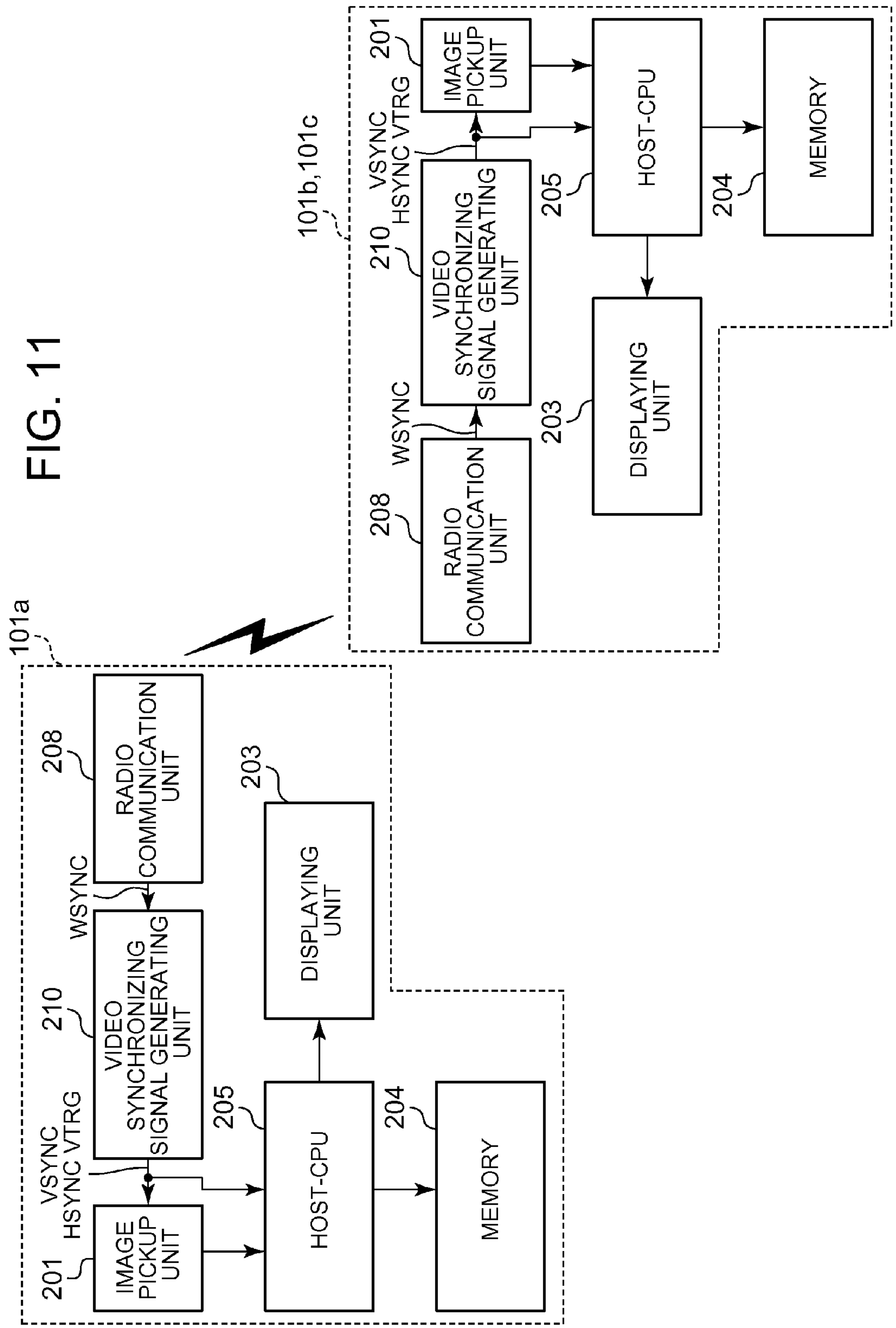
FIG. 11 is a conceptual diagram for explaining the synchronous operation (synchronous playing-back operation) between the high-speed cameras according to the present embodiment of the invention.

FIG. 11 is a conceptual diagram for explaining the synchronous operation (synchronous playing-back operation) between the plural high-speed cameras 101 according to the present embodiment of the invention. In FIG. 11, only the elements are shown, which are required for performing the synchronous operation. In FIG. 11, the high-speed camera 101*a* operates as the master apparatus and the high-speed cameras 101*b*, 101*c* operate as the slave apparatuses.

In the high-speed camera 101*a*, the radio communication unit 208*a* outputs the radio synchronizing signal "WSYNC", which is synchronized in phase (or coincident at the edge timing) with the radio synchronous communication performed by the radio communication units 208*b*, 208*c* of the high-speed cameras 101*b*, 101*c*. The video synchronizing signal generating unit 210*a* generates the video synchronizing signals "VSYNC", "HSYNC", "VTRG" having a predetermined cycle and synchronized with the above radio synchronizing signal "WSYNC", wherein the video synchronizing signals are synchronized with those generated by the high-speed cameras 101*b*, 101*c*. The image pickup unit 201*a* shoots a moving image synchronized with those to be shot by the other image pickup units 201*b*, 201*c* in accordance with the above video synchronizing signals "VSYNC", "HSYNC", "VTRG", and records the moving image in the memory 204*a*.

Meanwhile, similarly to the high-speed camera 101*a*, in the high-speed cameras 101*b*, 101*c*, the radio communication units 208*b*, 208*c* output the radio synchronizing signals "WSYNC", which are synchronized in phase (or coincident at the edge timing) with the radio synchronous communication performed by the radio communication unit 208*a* of the high-speed cameras 101*a*. The video synchronizing signal generating units 210*b*, 210*c* generate the video synchronizing signals "VSYNC", "HSYNC", "VTRG" having a predetermined cycle and synchronized with the above radio synchronizing signals "WSYNC", wherein the video synchronizing signals are synchronized with those generated in the high-speed camera 101*a*. The image pickup units 201*b*, 201*c* shoot moving images synchronized with the moving image to be shot by the high-speed camera 101*a* in accordance with the above video synchronizing signals "VSYNC", "HSYNC", "VTRG", and record the moving images in the memories 204*b*, 204*c*, respectively.

Further, in the high-speed camera 101*a* operating as the master apparatus and the high-speed cameras 101*b*, 101*c* operating as the slave apparatuses, HOST-CPU 205*a*, 205*b*, 205*c* synchronize the real times counted by RTC 207*a*, 207*b*, 207*c* (not shown) with the radio synchronizing signals "WSYNC", and correlate the real times with the shot moving images, recording the real times correlated with the moving images in the memories 204*a*, 204*b*, 204*c*, respectively.

When playing back the moving images recorded in the memories 204*a*, 204*b*, 204*c* in the high-speed camera 101*a* operating as the master apparatus and in the high-speed cameras 101*b*, 101*c* operating as the slave apparatuses, the following conditions are previously set based on the real times correlated with said moving images, before the playing back operation is performed: (1) from which frames of the moving images are to be played back; and (2) at what point of the real times counted by RTC 207*a*, 207*b*, 207*c* (not shown) the playing back operation is to start.

In the playing back operation, the radio communication unit 208*a* of the high-speed camera 101*a* operating as the master apparatus establishes the radio synchronous communication with the radio communication units 208*b*, 208*c* of the high-speed cameras 101*b*, 101*c* operating as the slave apparatuses. Then, HOST-CPU 205*a*, 205*b*, 205*c* read the moving images respectively from the memories 204*a*, 204*b*, 204*c*, in accordance with the video synchronizing signals "VSYNC", "HSYNC", "VTRG" and the real times counted by RTC 207*a*, 207*b*, 207*c* (not shown), wherein the above video synchronizing signals "VSYNC", "HSYNC", "VTRG" have a predetermined cycle and are synchronized with the above radio synchronizing signals "WSYNC", which are synchronized with in phase (or coincident at the edge timing), and are further synchronized with the video synchronizing signals generated by the other cameras. Further, HOST-CPU 205*a*, 205*b*, 205*c* display the above moving images respectively on the displaying units 203*a*, 203*b*, 203*c* in synchronization with the other cameras.

As a result, in the high-speed camera 101*a* operating as the master apparatus and the high-speed cameras 101*b*, 101*c* operating as the slave apparatuses, HOST-CPU 205*a*, 205*b*, 205*c* can play back the moving images, which are synchronized in phase with each other (that is, the moving images, which are coincident in the horizontal and (or) vertical synchronizing signals), through operations of the radio communication units 208*a*, 208*b*, 208*c* and the video synchronizing signal generating units 210*a*, 210*b*, 210*c*.

Further, in the master apparatus or the high-speed camera 101*a* and the slave apparatuses or the high-speed cameras 101*b*, 101*c*, HOST-CPU 205*a*, 205*b*, 205*c* synchronize the real times counted by RTC 207*a*, 207*b*, 207*c* (not shown) with the radio synchronizing signal "WSYNC", and correlate the real times with the moving images, respectively, whereby each HOST-CPU records the moving image correlated with the real time. As a result, the master apparatus or the high-speed camera 101*a* and the slave apparatuses or the high-speed cameras 101*b*, 101*c* each can simultaneously record the synchronized real time together with the moving image.

Accordingly, the high-speed camera 101*a* or the master apparatus and the high-speed cameras 101*b*, 101*c* or the slave apparatuses can play back the moving images recorded respectively in the memories 204*a*, 204*b*, 204*c* in synchronization with each other, based on the real times correlated with said moving images recorded in the memories 204*a*, 204*b*, 204*c*.

F. Synchronous Operation Between High-Speed Cameras and Sensor Devices (Synchronous Playing-Back Operation).

Figure 12:
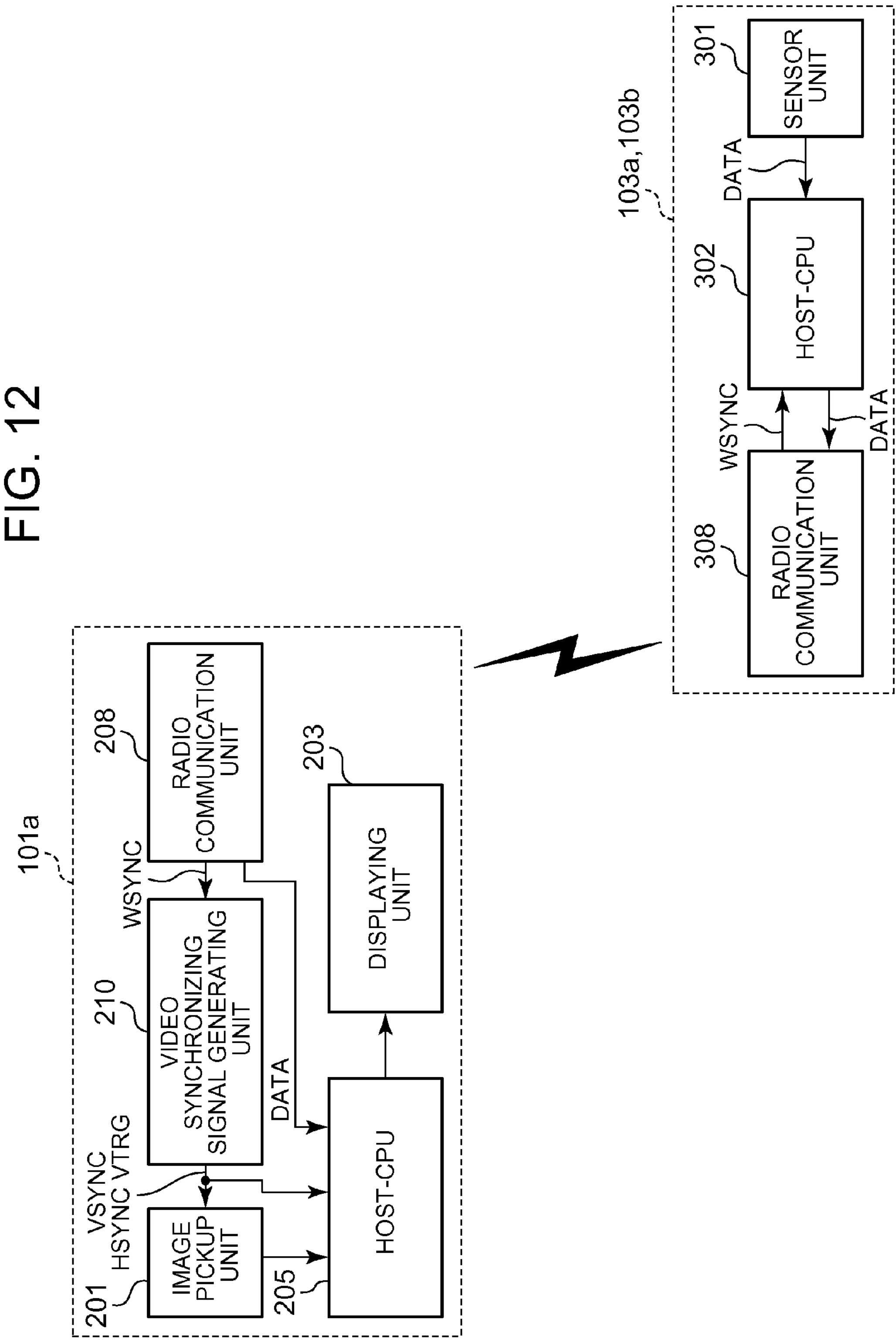
FIG. 12 is a conceptual diagram for explaining the synchronous operation (synchronous playing-back operation of moving image and sensor data) between the high-speed cameras and the sensor devices according to the present embodiment of the invention.

FIG. 12 is a conceptual diagram for explaining the synchronous operation between the high-speed cameras 101 and the sensor devices 103 (synchronous play-back operation of moving image and sensor data) according to the present embodiment of the invention. In FIG. 12, the high-speed camera 101*a* operates as the master apparatus and the sensor devices 103*a*, 103*b* operate as the slave devices.

In the sensor devices 103*a*, 103*b*, HOST-CPU 302*a*, 302*b* synchronize the real times counted by RTC 303*a*, 303*b* (not shown) with the radio synchronizing signals "WSYNC", and correlate the real times with the obtained sensor data "DATA", whereby each HOST-CPU records the real time correlated with the sensor data "DATA". Further, HOST-CPU 302*a*, 302*b* send the high-speed camera 101*a* the obtained sensor data "DATA" together with the real times (data obtaining time) correlated therewith at a predetermined sending timing (or at a real time) through the radio communication units 308*a*, 308*b*. Or in response to the request from the high-speed camera 101*a*, HOST-CPU 302*a*, 302*b* send the high-speed camera 101*a* the obtained sensor data "DATA" together with the correlated real time (data obtaining time).

In the high-speed camera 101*a* operating as the master apparatus, with the radio synchronous communication established between the radio communication unit 208*a* and the sensor devices 103*a*, 103*b*, HOST-CPU 205*a* displays on the displaying units 203*a* the above moving image shot by the image pickup units 201*a*, in accordance with the video synchronizing signals "VSYNC", "HSYNC", "VTRG" synchronized with the radio synchronizing signal "WSYNC", wherein said radio synchronizing signal "WSYNC" is synchronized in phase (or coincident at the edge timing) with the above radio synchronous communication.

At this time, HOST-CPU 205*a* receives the sensor data "DATA" from sensor devices 103*a*, 103*b* through the radio communication unit 208*a*, and displays the received sensor data "DATA" on the displaying unit 203*a* in synchronization with the above moving image in accordance with the real time recorded in correlation with said sensor data "DATA".

As a result, the sensor devices 103*a*, 103*b* can send the high-speed camera 101*a* the sensor data "DATA" synchronized in phase (or coincident at a sensing timing) with the high-speed camera 101*a*. The high-speed camera 101*a* operating as the master apparatus receives the sensor data "DATA" sent from plural sensor devices 103*a*, 103*b* and can play back the sensor data "DATA" in synchronization with the shot moving image.

The timing of playing back the moving image together with the received sensor data will do anytime (for instance, the next day and/or thereafter) after a moving image has been shot and the sensor data "DATA" has been received. Further, the moving image can be played back while said moving image is being shot, in other words, in practice, the moving image is played back late about 10 milliseconds at the earliest after said moving image is actually shot, because there causes a delay before the moving image is played back together with the received sensor data "DATA".

The sensor data "DATA" to be played back by the high-speed camera 101*a* can be live data or processed data.

Figure 13A:
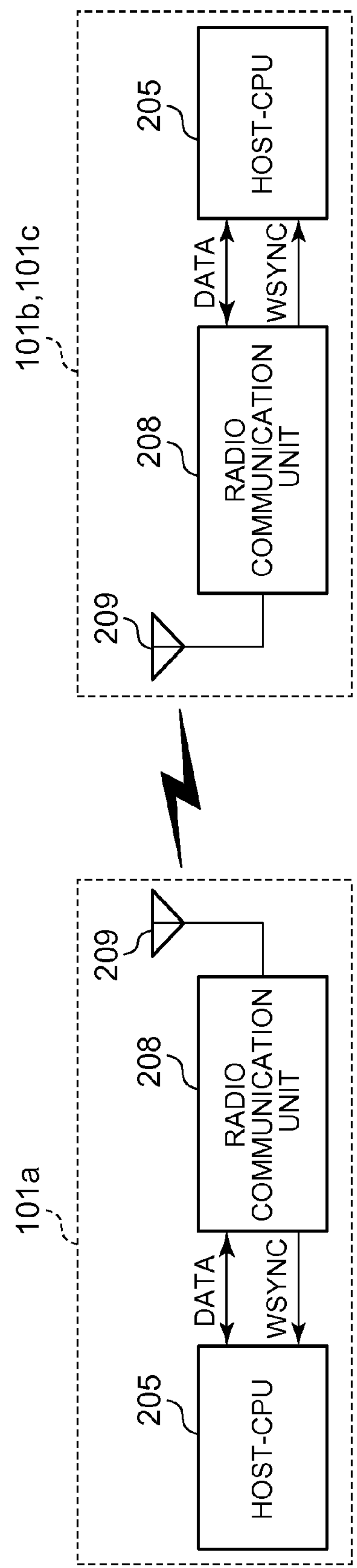
FIGS. 13*a* and 13*b* are conceptual diagrams for explaining data sending/receiving operation between the radio communication unit of the high-speed camera and the radio communication unit of the other high-speed camera according to the present embodiment of the invention.
Figure 13B:
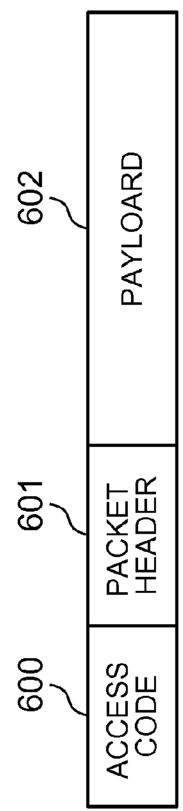

FIGS. 13*a* and 13*b* are conceptual diagrams for explaining data sending/receiving operation performed between the radio communication unit 208*a* of the high-speed camera 101*a* and the radio communication unit 208*b* of the high-speed camera 101*b* according to the present embodiment of the invention. In FIG. 13*a*, the radio synchronization system 100 comprises one master apparatus or the high-speed camera 101*a* and one slave apparatus or more or high-speed cameras 101*b*, 101*c*.

The master apparatus or the high-speed camera 101*a* and the slave apparatus or the high-speed camera 101*b* establish the radio synchronous communication between their radio communication units 208*a* and 208*b*. Their radio communication units 208*a*, 208*b* generate the radio synchronizing signals "WSYNC", which are synchronized in phase (or coincident at the edge timing) with the radio synchronous communication. HOST-CPU 205*a*, 205*b* shoot (or record) the moving images in accordance with the radio synchronizing signals "WSYNC", respectively.

FIG. 13*b* is a conceptual diagram for indicating a format of a packet to be sent and/or received between the radio communication units 208*a* and 208*b* according to the present embodiment of the invention. The packet consists of an access code 600, a packet header 601 and a payload 602.

Figure 14:
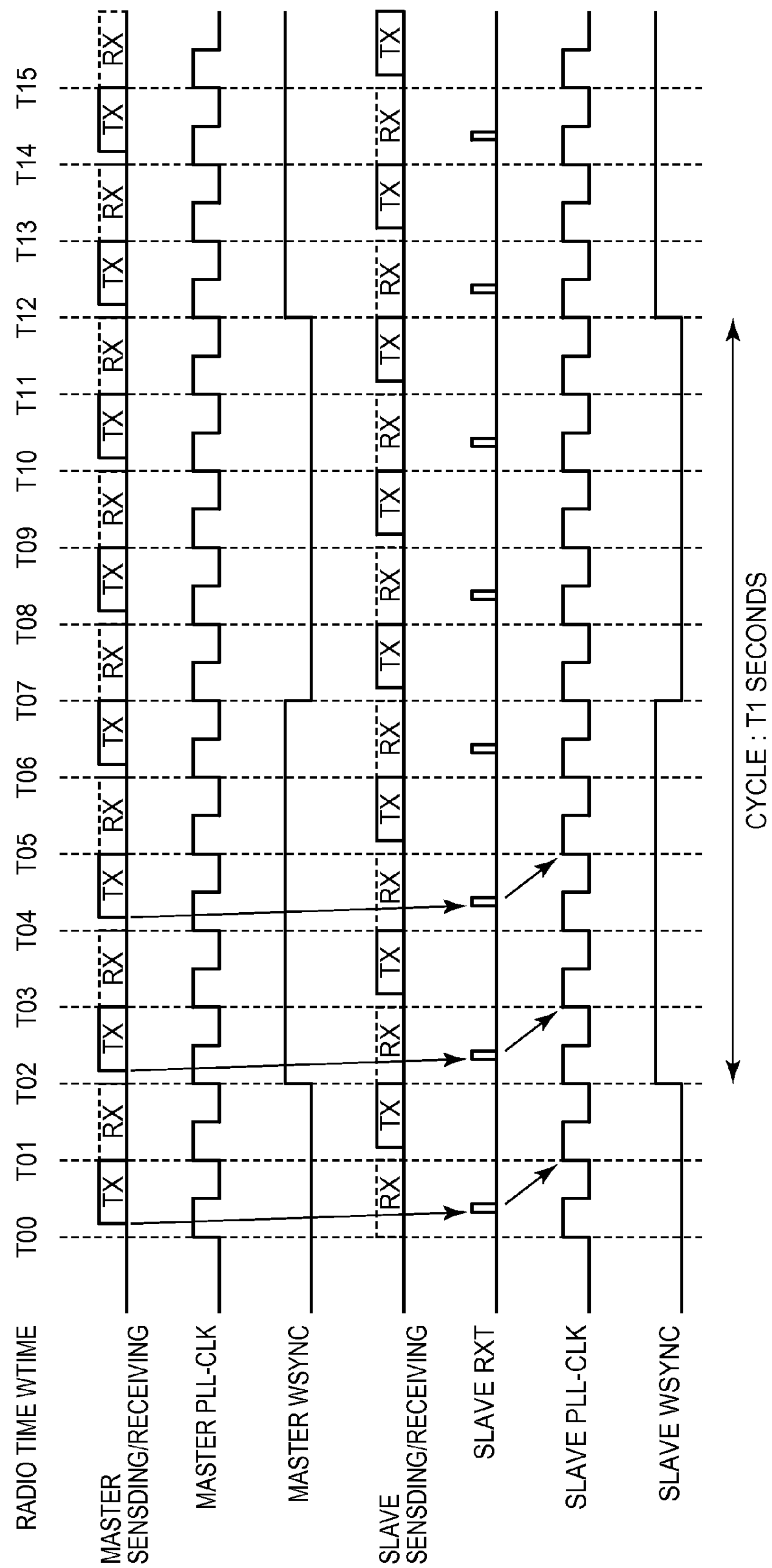
FIG. 14 is a timing chart of data sending/receiving operation (continuous communication) performed between the radio communication unit of the master apparatus or the high-speed camera and the radio communication unit of the slave apparatus or the other high-speed camera according to the present embodiment of the invention.

FIG. 14 is a timing chart of data sending/receiving operation (continuous communication) performed between the radio communication unit 208*a* of the high-speed camera 101*a* or the master apparatus and the radio communication unit 208*b* of the high-speed camera 101*b* or the slave apparatus according to the present embodiment of the invention. As shown by way of example in the timing chart of FIG. 14, both the radio synchronizing signals "WSYNC" generated in the master apparatus or the high-speed camera 101*a* and in the slave apparatus or the high-speed camera 101*b* rise up at a time of "T02" and thereafter, repeatedly rise up with a cycle of T1 seconds. The radio synchronizing signal "WSYNC" of the slave apparatus or the high-speed camera 101*b* has jitters (of about several microseconds) and subtle difference from the radio synchronizing signal "WSYNC" of the master apparatus or the high-speed camera 101*a*.

Figure 15:
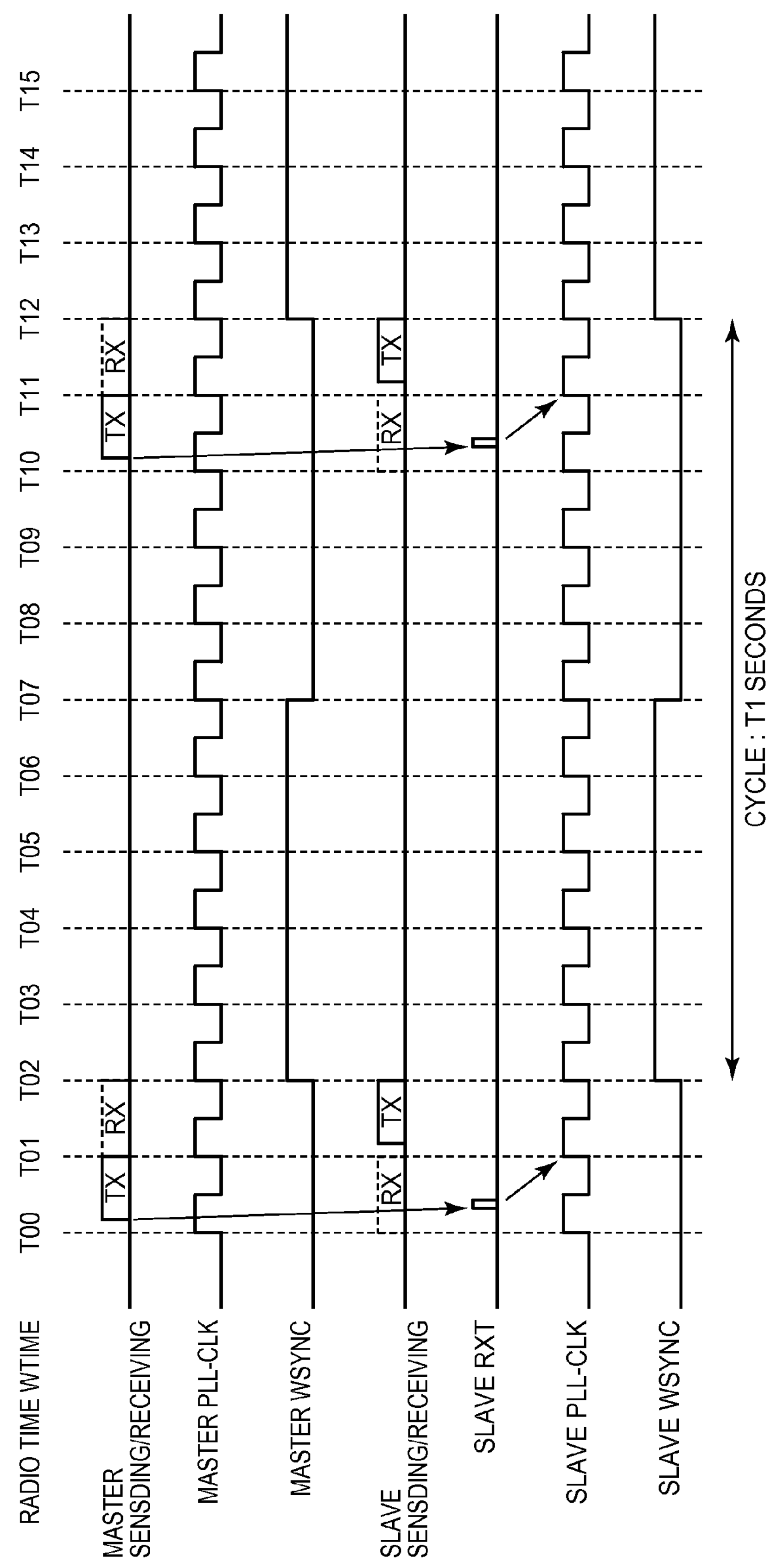
FIG. 15 is a timing chart of data sending/receiving operation (intermittent operation) performed between the radio communication unit of the master apparatus or the high-speed camera and the radio communication unit of the slave apparatus or the other high-speed camera according to the present embodiment of the invention.

FIG. 15 is a timing chart of data sending/receiving operation (intermittent communication) performed between the radio communication unit 208*a* of the high-speed camera 101*a* or the master apparatus and the radio communication unit 208*b* of the high-speed camera 101*b* or the slave apparatus according to the present embodiment of the invention. As shown by way of example in the timing chart of FIG. 15, both the radio synchronizing signals "WSYNC" generated in the master apparatus or the high-speed camera 101*a* and in the slave apparatus or the high-speed camera 101*b* rise up at a time of "T02" and thereafter, repeatedly rise up with a cycle of T1 seconds.

The jitters and subtle difference included in the radio synchronizing signal "WSYNC" of the slave apparatus or the high-speed camera 101*b* (shown in FIG. 15) are larger in an allowable range than those included in the radio synchronizing signal "WSYNC" used in case of the continuous communication shown in FIG. 14. An interval of data sensing/receiving operation is set to an intermittent interval ( . . . T¼, T½, T1, 2×T1, 4×T1, . . . ) allowable for the video synchronizing signal to save energy.

For instance, if the clock is ±20 ppm both in the master apparatus or the high-speed camera 101*a* and the slave apparatus or the high-speed camera 101*b*, a difference of ±40 microseconds, at worst, will be caused between the master and slave apparatuses in the radio synchronizing signal "WSYNC", when communication is interrupted for a period of one second. Therefore, it will be understood that communication is required at least once in a period of 250 milliseconds to bring such difference into a range of ±10 microseconds. In other words, when the high-speed camera 101*a* operating as the master apparatus communicates with the high-speed camera 101*b* operating as slave apparatus at least once in the period of 250 milliseconds, the synchronization can be established between the high-speed camera 101*a* and the high-speed camera 101*b*.

Figure 16:
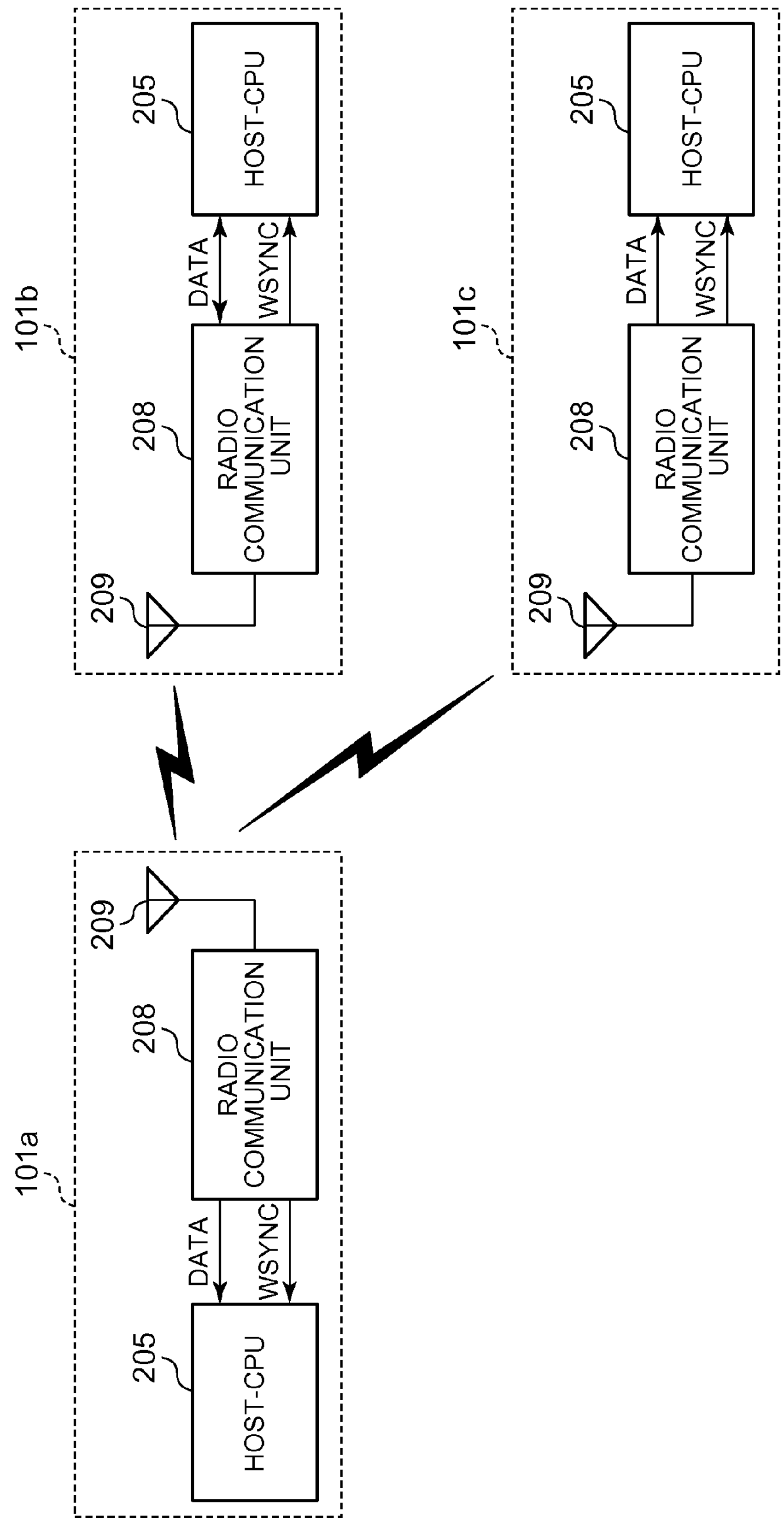
FIG. 16 is a conceptual diagram for explaining the data sending/receiving operation performed between the radio communication units in the case of one master apparatus (high-speed camera) vs. "n" units of slave apparatuses (high-speed cameras).

FIG. 16 is a conceptual diagram for explaining the data sending/receiving operation performed between the radio communication units 208*a*, 208*b*, 208*c* in the case of one master apparatus (high-speed camera) vs. "n" units of slave apparatuses (high-speed cameras). The radio communication unit 208*a* of the high-speed camera 101*a* (master apparatus) can be wirelessly connected to the plural radio communication units 208*b*, 208*c* of the high-speed cameras 101*b*, 101*c* (slave apparatuses). Even in the wireless connection including one master apparatus and "n" units of slave apparatuses, the master apparatus and the slave apparatuses can be synchronized with each other in the same manner as described in the section of "A. Synchronous Operation between High-speed Cameras (synchronous shooting operation)".

Figure 17:
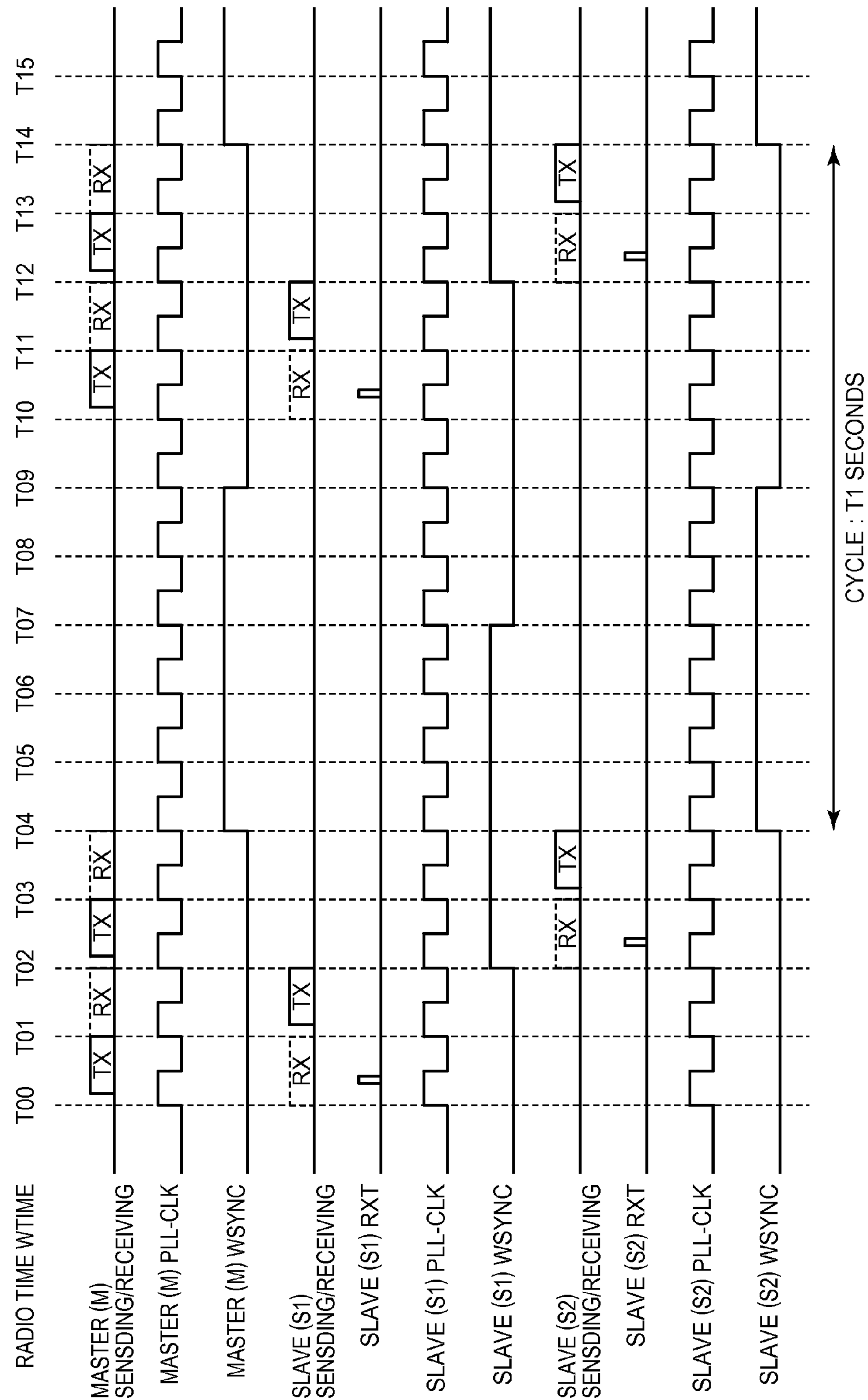
FIG. 17 is a timing chart of the data sending/receiving operation performed between the radio communication units in the case of one master apparatus (high-speed camera) vs. "n" units of slave apparatuses (high-speed cameras).

FIG. 17 is a timing chart of the data sending/receiving operation performed between the radio communication units 208*a*, 208*b*, 208*c* in the case of one master apparatus (high-speed camera) vs. "n" units of slave apparatuses (high-speed cameras). The high-speed camera 101*a* operating as the master apparatus exchanges data with the high-speed camera 101*b* operating as the slave apparatus during a period from a time of "T00" to a time of "T02", and also exchange data with the high-speed camera 101*c* operating as the slave apparatus during a period from the time of "T02" to a time of "T04". In either of the high-speed camera 101*a* operating as the master apparatus and the high-speed cameras 101*b*, 101*c* operating as the slave apparatuses, the radio synchronizing signals "WSYNC" shown by way of example in FIG. 17 rise up at the time of "T04", and thereafter, repeatedly rise up with a cycle of T1 seconds.

As described above, the embodiments of the invention allow plural high-speed cameras to shoot moving images in synchronization and plural sensor devices to obtain data in synchronization with the moving images shot by the plural high-speed cameras with a high degree of accuracy, in addition to saving energy, and reducing in size and costs.

Employing the wireless system, the high-speed cameras and sensor devices can be installed and/or provided on any places without disturbing the players and allow the users to enjoy greater flexibility and the consumers to operate in a simple manner. As a result, the high-speed cameras and sensor devices according to the embodiments of the invention can be used for easy and accurate motion analysis in various fields of sports including golf, tennis, baseball and the like.

The advantages of the embodiments of the invention will be described more particularly.

In the embodiment of the invention, when plural high-speed cameras are used for a high-speed shooting in motion analysis in various sports, the plural high-speed cameras can be synchronized to shoot one object from plural angles.

Further in the embodiment of the invention, the image shootings by the high-speed cameras and the operations of the sensor devices attached on the object and (or) on the equipment can be synchronized with each other.

In the embodiment of the invention, the real time is shared among the plural high-speed cameras and the plural sensor devices wirelessly synchronized with each other, and the real time, which is shared when images are shot and sensor data is obtained, can be recorded together with the image data and sensor data.

Further, when obtaining the sensor data in synchronization with the image shooting operation by the high-speed camera, the sensor device can send the obtained sensor data to the high-speed camera, and the high-speed camera can record the received sensor data together with the pickup image.

In the radio synchronization system comprising plural high-speed cameras and sensor devices, all of which being wirelessly synchronized with each other, and one of the high-speed cameras operating as the master apparatus and the other cameras and devices operating as slave apparatuses, the user can give an instruction of operation to all the apparatuses and devices in the radio synchronization system, only by giving the master apparatus the instruction to be given to all the slave apparatuses, wherein the instruction is to inform the starting/finishing time of the shooting operation, the starting/finishing time of obtaining the sensor data, a frame rate of shooting image, a data obtaining rate, and other setting information.

Further, in the radio synchronization system, the moving images shot in synchronization by plural high-speed cameras can be played back in synchronization by the plural high-speed cameras, when an instruction is given to one high-speed camera operating as the master apparatus.

Further, the sensor data obtained in synchronization with and stored together with the moving images in the high-speed cameras can be displayed in synchronization with reproduction of the moving image.

In the case where a pickup image is stored in one high-speed camera operating as the master apparatus and sensor data obtained in synchronization are stored in plural sensor devices, when an instruction is given to the high-speed camera operating as the master apparatus, the sensor data can be transferred from the plural sensor devices to the high-speed camera operating as the master apparatus. The high-speed camera operating as the master apparatus can display the received sensor data in synchronization with reproduction of the pickup image, and also can store the received sensor data.

Further, in the radio synchronization system, the high-speed shooting operations by the high-speed cameras and the operation of obtaining the sensor data by the sensor devices are synchronized with each other, and further the pickup images and the sensor data are correlated with the real time, which has been shared between the high-speed cameras and the sensor devices. Therefore, the pickup image corresponding to a time of a particular point of the sensor data can be chosen after the shooting operation finishes.

Although specific embodiments of the invention have been described in the foregoing detailed description, it will be understood that the invention is not limited to the particular embodiments described herein, modifications and rearrangements may be made to the disclosed embodiments while remaining within the scope of the invention as defined by the following claims. It is intended to include all such modifications and rearrangements in the following claims and their equivalents.

What is claimed is:

1. A wireless synchronous system comprising:

a first apparatus;

a second apparatus; and a sensor device;

wherein the first apparatus comprises:

a first radio communicating circuit which performs synchronous radio communication with the second apparatus via a first antenna, wherein the first radio communicating circuit generates and outputs a first radio synchronizing signal having a predetermined cycle which is synchronized with a timing of the synchronous communication, at least one of a rising edge and a falling edge of the first radio synchronizing signal coinciding with a rising edge or a falling edge of a clock signal of the second apparatus; and a first processor which receives the first radio synchronizing signal from the first radio communicating circuit and determines a timing of controlling the first apparatus in accordance with the first radio synchronizing signal; and wherein the sensor device comprises:

a second radio communicating circuit which performs synchronous radio communication with the first apparatus via a second antenna, wherein the second radio communicating circuit generates and outputs a second radio synchronizing signal having a predetermined cycle which is synchronized with a timing of the synchronous communication, at least one of a rising edge and a falling edge of the second radio synchronizing signal coinciding with a rising edge or a falling edge of a clock signal of the first apparatus;

a sensor which obtains detection-data representing a state of the sensor device; and a second processor which receives the second radio synchronizing signal from the second radio communicating circuit and determines a timing of obtaining the detection-data via the sensor in accordance with the second radio synchronizing signal;

wherein the first apparatus further comprises:

an image pickup unit including an image sensor operable to take an image to obtain image data;

a first memory; and a first real-time clock which generates a first real time signal;

wherein the first processor determines a timing of taking an image by the image pickup unit in accordance with the first radio synchronizing signal, and performs control to store the image in the first memory;

wherein the first processor synchronizes the first real time signal with the first radio synchronization signal to synchronize the first real time signal with a time signal in the second apparatus; and wherein the first processor correlates the first real time signal generated by the first real-time clock with the image data, which is obtained by the image pickup unit at the timing determined by the processor, and performs control to record the first real time signal correlated with the image data in the first memory.

2. The wireless synchronous system according to claim 1, wherein the sensor device further comprises:

a second real-time clock which generates a second real time signal; and a second memory;

wherein the second processor synchronizes the second real time signal with the second radio synchronization signal to synchronize the second real time signal with a time signal in the first apparatus; and wherein the second processor correlates the second real time signal generated by the second real-time clock with the detection-data, which is obtained by the sensor at the timing determined by the second processor, and performs control to record the second real time signal correlated with the detection-data in the second memory.

3. The wireless synchronous system according to claim 2, wherein:

the second processor performs control to send the obtained detection-data correlated with the second real time signal to the first apparatus;

the first processor correlates the detection-data correlated with the second real time signal and received by the first apparatus from the sensor device, with the image data correlated with the first real time signal corresponding to the second real time signal, and performs control to record the detection-data correlated with the image data in the first memory.

4. The wireless synchronous system according to claim 3, wherein the first processor performs control to play back the detection-data received by the first apparatus from the sensor device, in synchronization based on the first real time signal and the second real time signal, when the image data recorded in the first memory is played back in synchronization in accordance with the first radio synchronizing signal.

5. The wireless synchronous system according to claim 1, wherein the first processor performs control to play back the image data recorded in the first memory, in accordance with the first radio synchronizing signal, the image data being correlated with the first real time signal and recorded in the first memory.

6. The wireless synchronous system according to claim 1, wherein the second radio communicating circuit performs synchronous radio communication with another sensor device via the second antenna, and generates and outputs the second radio synchronizing signal to have a predetermined cycle which is synchronized with a timing of the synchronous communication with the other sensor device, at least one of a rising edge and a falling edge of the second radio synchronizing signal coinciding with a rising edge or a falling edge of a clock signal of the other sensor device.

7. A wireless apparatus comprising:

a radio communicating circuit which performs synchronous radio communication with an external wireless apparatus via an antenna, wherein the radio communicating circuit generates and outputs a radio synchronizing signal having a predetermined cycle which is synchronized with a timing of the synchronous communication, at least one of a rising edge and a falling edge of the radio synchronizing signal coinciding with a rising edge or a falling edge of a clock signal of the external wireless apparatus;

a processor which receives the radio synchronizing signal from the radio communicating circuit and determines a timing of controlling the apparatus, in accordance with the radio synchronizing signal;

an image pickup unit including an image sensor operable to take an image to obtain image data;

a memory; and a real-time clock which generates a real time signal;

wherein the processor determines a timing of taking an image by the image pickup unit in accordance with the radio synchronizing signal, and performs control to store the image in the memory;

wherein the processor synchronizes the real time signal with the radio synchronization signal to synchronize the real time signal with a time signal in the external wireless apparatus; and wherein the processor correlates the real time signal generated by the real-time clock with the image data, which is obtained by the image pickup unit at the timing determined by the processor, and performs control to record the real time signal correlated with the image data in the first memory.

8. A sensor device comprising:

a radio communicating circuit which performs synchronous radio communication with an external wireless apparatus via an antenna, wherein the radio communicating circuit generates and outputs a radio synchronizing signal having a predetermined cycle which is synchronized with a timing of the synchronous communication, at least one of a rising edge and a falling edge of the radio synchronizing signal coinciding with a rising edge or a falling edge of a clock signal of the external wireless apparatus;

a sensor which obtains detection-data representing a state of the sensor device;

a processor which receives the radio synchronizing signal from the radio communicating circuit and determines a timing of obtaining the detection-data via the sensor in accordance with the radio synchronizing signal;

a real-time clock which generates a real time signal; and a memory;

wherein the processor synchronizes the real time signal with the radio synchronization signal to synchronize the real time signal with a time signal in the external wireless apparatus; and wherein the processor correlates the real time signal generated by the real-time clock with the detection-data, which is obtained by the sensor at the timing determined by the processor, and performs control to record the real time signal correlated with the detection-data in the memory.

9. A method of implementing wireless synchronization in a system including a first apparatus, a second apparatus, and a sensor device, the method comprising:

by the first apparatus:

performing, by a first radio communicating circuit, synchronous radio communication with the second apparatus;

generating a first radio synchronizing signal having a predetermined cycle which is synchronized with a timing of the synchronous communication, at least one of a rising edge and a falling edge of the first radio synchronizing signal coinciding with a rising edge or a falling edge of a clock signal of the second apparatus; and determining a timing of controlling the first apparatus, in accordance with the radio synchronizing signal; and by the sensor device:

performing, by a second radio communicating circuit, synchronous radio communication with the first apparatus;

generating a second radio synchronizing signal having a predetermined cycle which is synchronized with a timing of the synchronous communication, at least one of a rising edge and a falling edge of the second radio synchronizing signal coinciding with a rising edge or a falling edge of a clock signal of the first apparatus;

obtaining detection-data representing a state of the sensor device; and determining a timing, at which the sensor unit obtains the detection-data, in accordance with the second radio synchronizing signal;

wherein the first apparatus comprises (i) an image pickup unit including an image sensor operable to take an image to obtain image data, (ii) a first memory, and (iii) a first real-time clock which generates a first real time signal;

wherein determining the timing of controlling the first apparatus comprises determining a timing of taking an image by the image pickup unit in accordance with the first radio synchronizing signal; and wherein the method further comprises, by the first apparatus:

storing the image in the first memory;

synchronizing the first real time signal with the first radio synchronization signal to synchronize the first real time signal with a time signal in the second apparatus; and correlating the first real time signal generated by the first real-time clock with the image data, which is obtained by the image pickup unit at the determined timing, and recording the first real time signal correlated with the image data in the first memory.

10. A non-transitory computer-readable recording medium storing a computer program which is executable by a computer to control an apparatus, the apparatus including an image pickup unit including an image sensor operable to take an image to obtain image data, a memory, and a real-time clock which generates a real time signal, and the program being executable to control the apparatus to perform functions comprising:

performing, by a radio communicating circuit, synchronous radio communication with an external wireless apparatus;

generating a radio synchronizing signal having a predetermined cycle which is synchronized with a timing of the synchronous communication, at least one of a rising edge and a falling edge of the radio synchronizing signal coinciding with a rising edge or a falling edge of a clock signal of the external wireless apparatus;

determining a timing of taking an image by the image pickup unit in accordance with the radio synchronizing signal, and storing the image in the memory;

synchronizing the real time signal with the radio synchronization signal to synchronize the real time signal with a time signal in the external wireless apparatus; and correlating the real time signal generated by the real-time clock with the image data, which is obtained by the image pickup unit at the determined timing, and recording the real time signal correlated with the image data in the memory.

11. A non-transitory computer-readable recording medium storing a computer program which is executable by a computer to control a sensor device that includes a real-time clock which generates a real time signal, and a memory, the program being executable to control the sensor device to perform functions comprising:

performing, by a radio communicating circuit, synchronous radio communication with an external wireless apparatus;

generating a radio synchronizing signal having a predetermined cycle which is synchronized with a timing of the synchronous communication, at least one of a rising edge and a falling edge of the radio synchronizing signal coinciding with a rising edge or a falling edge of a clock signal of the external wireless apparatus;

obtaining detection-data representing a state of the sensor device;

determining a timing to obtain the detection-data in accordance with the radio synchronizing signal;

synchronizing the real time signal with the radio synchronization signal to synchronize the real time signal with a time signal in the external wireless apparatus; and correlating the real time signal generated by the real-time clock with the detection-data, which is obtained by the sensor at the determined timing, and recording the real time signal correlated with the detection-data in the memory.

* * * * *